(12) United States Patent
Colvin et al.

(10) Patent No.: US 11,636,724 B2
(45) Date of Patent: Apr. 25, 2023

(54) SUPPORT STRUCTURE FOR CREATING CUSTOM CURVATURE OF FLEXIBLE DISPLAYS AND MOUNTING TO ELECTRONIC GAMING MACHINES

(71) Applicant: Gaming Arts, LLC, Las Vegas, NV (US)

(72) Inventors: David Colvin, Las Vegas, NV (US); Eric D. Colvin, Las Vegas, NV (US)

(*) Notice: Subject to any disclaimer, the term of this patent is extended or adjusted under 35 U.S.C. 154(b) by 0 days.

(21) Appl. No.: 16/849,755

(22) Filed: Apr. 15, 2020

(65) Prior Publication Data

US 2021/0327208 A1 Oct. 21, 2021

Related U.S. Application Data

(60) Provisional application No. 62/967,994, filed on Jan. 30, 2020.

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |
| *A63F 13/26* | (2014.01) |
| *A63F 13/90* | (2014.01) |

(52) U.S. Cl.
CPC .......... *G07F 17/3211* (2013.01); *A63F 13/26* (2014.09); *A63F 13/90* (2014.09); *G07F 17/3216* (2013.01)

(58) Field of Classification Search
CPC .............................. G07F 17/32; G07F 17/3201
USPC .................. 463/1, 5, 20, 30, 31, 39, 42
See application file for complete search history.

(56) References Cited

U.S. PATENT DOCUMENTS

| | | | |
|---|---|---|---|
| 8,105,161 B2 | 1/2012 | Rasmussen | |
| 10,245,776 B2* | 4/2019 | Franklin | ................. B29C 53/04 |
| 10,363,480 B2 | 7/2019 | Hennessy et al. | |
| 2004/0266518 A1 | 12/2004 | Gauselmann | |
| 2012/0004030 A1* | 1/2012 | Kelly | ...................... G07F 17/34 463/31 |
| 2012/0220353 A1 | 8/2012 | Massing et al. | |
| 2014/0357364 A1* | 12/2014 | Chudek | ............... G07F 17/3211 463/31 |
| 2016/0055703 A1* | 2/2016 | Woels | ................. G07F 17/3216 463/20 |
| 2018/0276942 A1 | 9/2018 | Whelan | |
| 2020/0111299 A1* | 4/2020 | Baker | ................. G07F 17/3223 |

* cited by examiner

*Primary Examiner* — Adetokunbo O Torimiro
(74) *Attorney, Agent, or Firm* — FisherBroyles, LLP; Rob L. Phillips

(57) ABSTRACT

Systems and methods are provided for mounting flexible displays, such as flexible OLED displays, to electronic gaming machines (EGMs). The flexible displays, including support structures, are relatively rigid once assembled and mounted to an EGM yet allow manufacture of relatively small quantities of custom shaped displays generally curved along single axis or multiple axes. The flexible display is manufactured utilizing thin bendable glass and bendable substrate and/or other similar materials to allow for the bendability of the display. While the bendability of the flexible display is desirable during the manufacture of the electronic gaming machine, it may not be desirable once manufactured and placed on the gaming floor in casino environments.

27 Claims, 15 Drawing Sheets

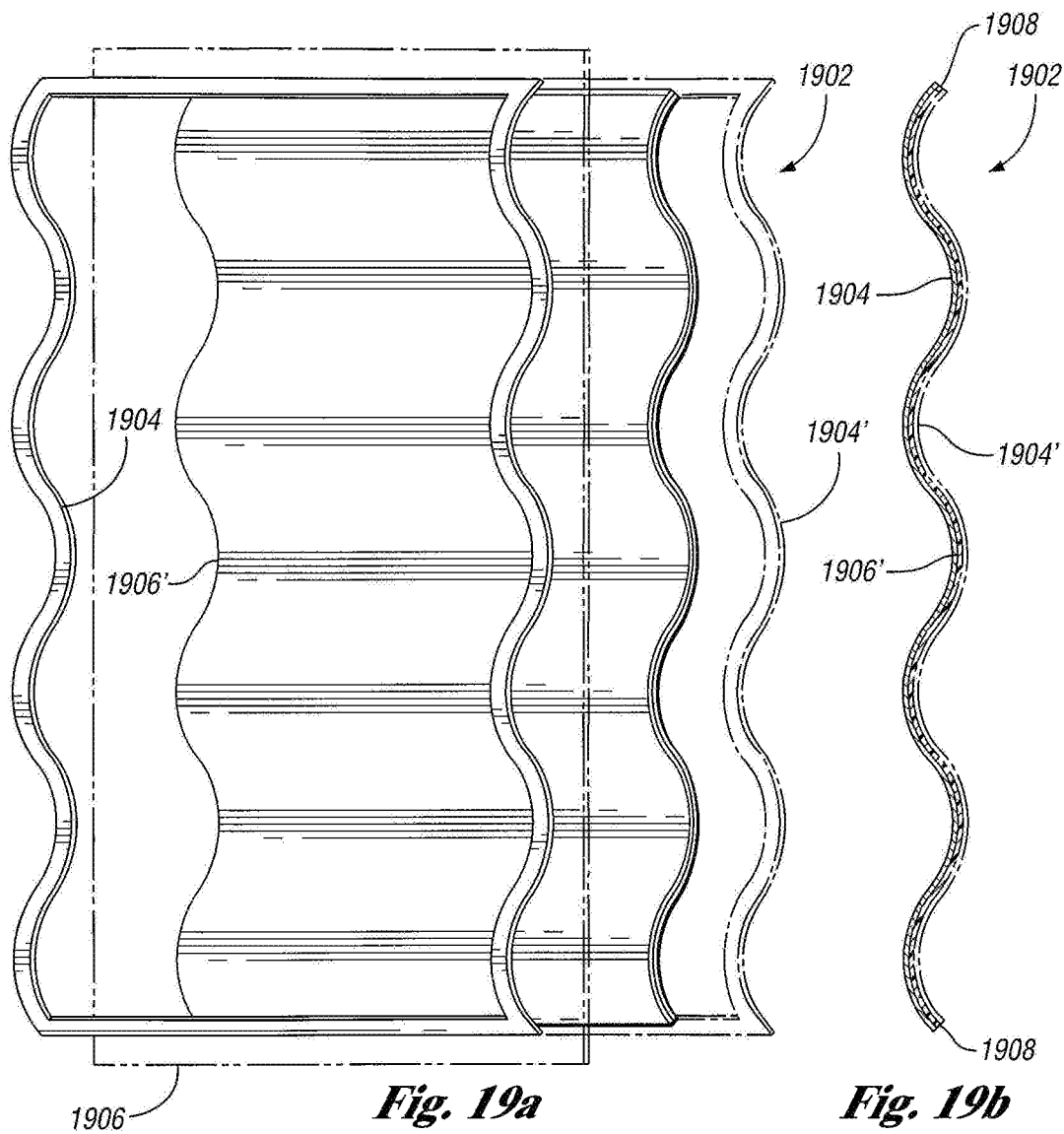
*Fig. 19a*
*Fig. 19b*
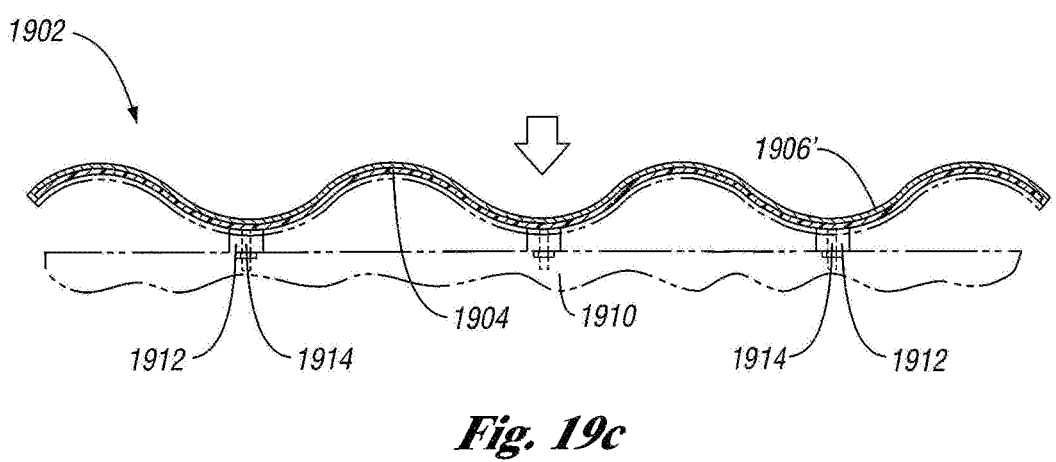
*Fig. 19c*

SUPPORT STRUCTURE FOR CREATING CUSTOM CURVATURE OF FLEXIBLE DISPLAYS AND MOUNTING TO ELECTRONIC GAMING MACHINES

FIELD OF THE INVENTION

The embodiments of the present invention relate to systems and methods for mounting flexible displays, such as a flexible organic light-emitting diode (OLED) display, to electronic gaming machines (EGMs) utilizing interchangeable rigid support structures to create custom shaped displays. The flexible displays, including relatively rigid support structures, are effectively rigid once mounted to an EGM yet allow manufacture of relatively small quantities of various custom shaped displays which are generally curved along a single axis although multi-axis curvature is also possible. The flexible displays may be touchscreen or non-touchscreen depending on intended use of the display once mounted to an EGM.

BACKGROUND

Casinos derive much of their gaming revenue from electronic gaming machines ("EGMs") such as slot machines. Over the years, EGMs have evolved to include new technologies such as dual or triple landscape oriented LCD game displays, LCD slot toppers, large portrait oriented displays, curved portrait oriented displays, J-curve portrait oriented displays, reverse J-curve portrait oriented displays, S-curve portrait mounted displays, EGM signage, and button decks including touch screen LCD displays, etc. Due to high-volume requirements and exceptionally high design and tooling costs, only select display manufacturers such as the Samsung Group, Innolux, and LG can reasonably manufacture these curved displays. Accordingly, specific display types are generally limited to the simpler curvatures as custom curved designs are not practical. As a result, most EGM manufacturers, including the world's largest EGM manufacturers, necessarily limit the displays offered to one or two curved display types and in many instances only one.

SUMMARY

One skilled in the art will recognize that certain types of EGMs, generally utilized in regulated casino environments, are still commonly referred to as "slot machines." Although the etymology of the term "slot machine" was originally derived from a coin slot in the gaming machines at the time, coin slots have long since generally been replaced by payment input devices or bill validators which only accept paper currency or ticket-in-ticket-out vouchers and/or electronic fund transfer means, such as card readers, mobile device payment means, account interfaces, etc., yet EGMs are still commonly referred to as slot machines. As a result, the terms EGM and slot machine are used interchangeably and are defined to mean an electronic gaming machine entirely different than a laptop or desktop computer, cell phones, tablet computer gaming devices and the like. Although EGMs are discussed in detail, the embodiments of the present invention have similar utility for any type gaming machine such as electronic, electromechanical or mechanical and regulated as Class II, Class III, VLT, pull tab, etc., type gaming machines which utilize flexible displays.

The embodiments of the present invention provide for rigid or semirigid support for mounting of flexible displays to (EGMs utilizing interchangeable rigid support structures to provide for custom shaped flexible displays. The flexible display may be either touchscreen or non-touchscreen depending on intended use on the EGM. Although flexible OLEDs are discussed in detail, one skilled in the art will recognize that any flexible display may be utilized with the embodiments of the present invention. While EGMs currently utilize curved portrait or landscape oriented displays, J-curve portrait oriented displays, reverse J-curve portrait oriented displays, S-curve portrait mounted displays, there is no viable means for rapidly or easily changing the curvature to allow for far more options as most current special curved displays come from larger display manufacturers such as those from the Samsung Group, Innolux, and LG or similar companies with high volume requirements and with very high special tooling costs often at a much higher price per display with tooling cost that can often exceed many hundreds of thousands of dollars. Such manufacturing techniques, while efficient for large scale production, present little or no way to rapidly change curvatures in smaller volumes. Due to the high cost and volume requirements, most EGM manufacturers, including the world's largest EGM manufacturers such as IGT, Scientific Games, and Aristocrat, necessarily limit the number of curved displays types offered to only a few curved display types and, in many instances, only one or two. Despite the cost of this type display, there remains a critical need for more display versatility to accommodate more players and their desire to try new and innovative EGM styles and game themes. Moreover, as the number of curved display design are somewhat limited for EGM manufactures, these same manufacturers are then stereotyped by virtue of their specific curved display designs resulting in players either liking or rejecting their games due to the association with a particular display curvature. In other words, due to lack of diversification, some players may prefer a simple curvature while other may prefer an S-curve display, while others prefer a J-curve design. As the present invention allows for a great increase in curve design types, manufacturers EGMs may appeal to an entirely new audience and may even be game type specific. For instance, a game theme depicting underwater themes may be configured with a multiple wave curvature, generally along the x-axis, while a standard video reel game may be configured with a convex curved portion of a constant radii, generally along the y-axis, to emulate mechanical or electro mechanical reel games while a slight concave display, generally along the x-axis, may be utilized for fantasy themed games while an outer space based game theme may include a much more pronounced concave display, generally along the x-axis, while a wide convex display, generally along the y-axis may be utilized for large scale background game themes. One skilled in the art will recognize there are almost no limits to way in which the displays are curved to coordinate with a given game theme. An object of the present invention is to provide a curved support structure or curved support structure assembly that will support the flexible display and where the flexible display, once mounted, emulates the same curvature as the curved support structure or curved support structure assembly thereby eliminating the need for special tooling and large volume requirements of standard manufacture of curved displays at the display manufacturing source. In addition, as the rigid support structure is interchangeable on an EGM, so are the flexible displays mounted on the rigid support structure whereas a flexible display may be used in one style curvature and then reused in different style curvature when differing curvature rigid support structures are utilized. Once the flexible display curvature is mounted to the curved rigid support structure or curved rigid support structure assembly, the top flexible display layer may utilize bendable glass or a formed glass or transparent polymeric layer over other display components. Another object of the present invention is to provide a curved rigid support structure assembly, including the flexible display, which is adapted for mounting onto the EGM. Such mounting may be direct onto a separate support structure of the EGM or the curved rigid support structure assembly, including the flexible display, may be raised above the separate support structure of the EGM to provide for a floating display appearance. One skilled in the art will recognize that a wide variety of mounting means may be utilized for final attachment of the curved rigid support structure assembly, including the flexible display, to the EGM.

Other variations, embodiments and features of the present invention will become evident from the following detailed description, drawings and claims.

BRIEF DESCRIPTION OF THE DRAWINGS

FIG. 12A illustrates an isometric view of an exemplar flexible display embodiment mounted to an exemplar rigid support structure of the present invention.

FIG. 12B illustrates a side view of an exemplar flexible display embodiment mounted to an exemplar rigid support structure of the present invention.

FIG. 13A illustrates an isometric view of another exemplar flexible display embodiment mounted to an exemplar rigid support structure of the present invention.

FIG. 13B illustrates a side view of another exemplar flexible display embodiment mounted to an exemplar rigid support structure of the present invention.

FIG. 14A illustrates an isometric view of yet another exemplar flexible display embodiment mounted to an exemplar rigid support structure of the present invention.

FIG. 14B illustrates a side view of yet another exemplar flexible display embodiment mounted to an exemplar rigid support structure of the present invention.

FIG. 15A illustrates an isometric view of another exemplar flexible display embodiment mounted to an exemplar rigid support structure of the present invention.

FIG. 15B illustrates a side view of another exemplar flexible display embodiment mounted to an exemplar rigid support structure of the present invention.

FIG. 18A illustrates an exploded isometric view of another embodiment of a flexible display formed by a frame type rigid support structure of the present invention.

FIG. 18B illustrates a side view of the flexible display formed by a frame type rigid support structure of FIG. 18A

FIG. 19A illustrates an isometric view of another embodiment of a flexible display formed by an internally open rigid support structure of the present invention.

FIG. 19B illustrates a side view of the flexible display formed an internally open rigid support structure of FIG. 19A; and FIG. 19C illustrates a schematic partial cross-section view of a flexible display formed by an internally open rigid support structure of the present invention.

DETAILED DESCRIPTION

Figure 1:
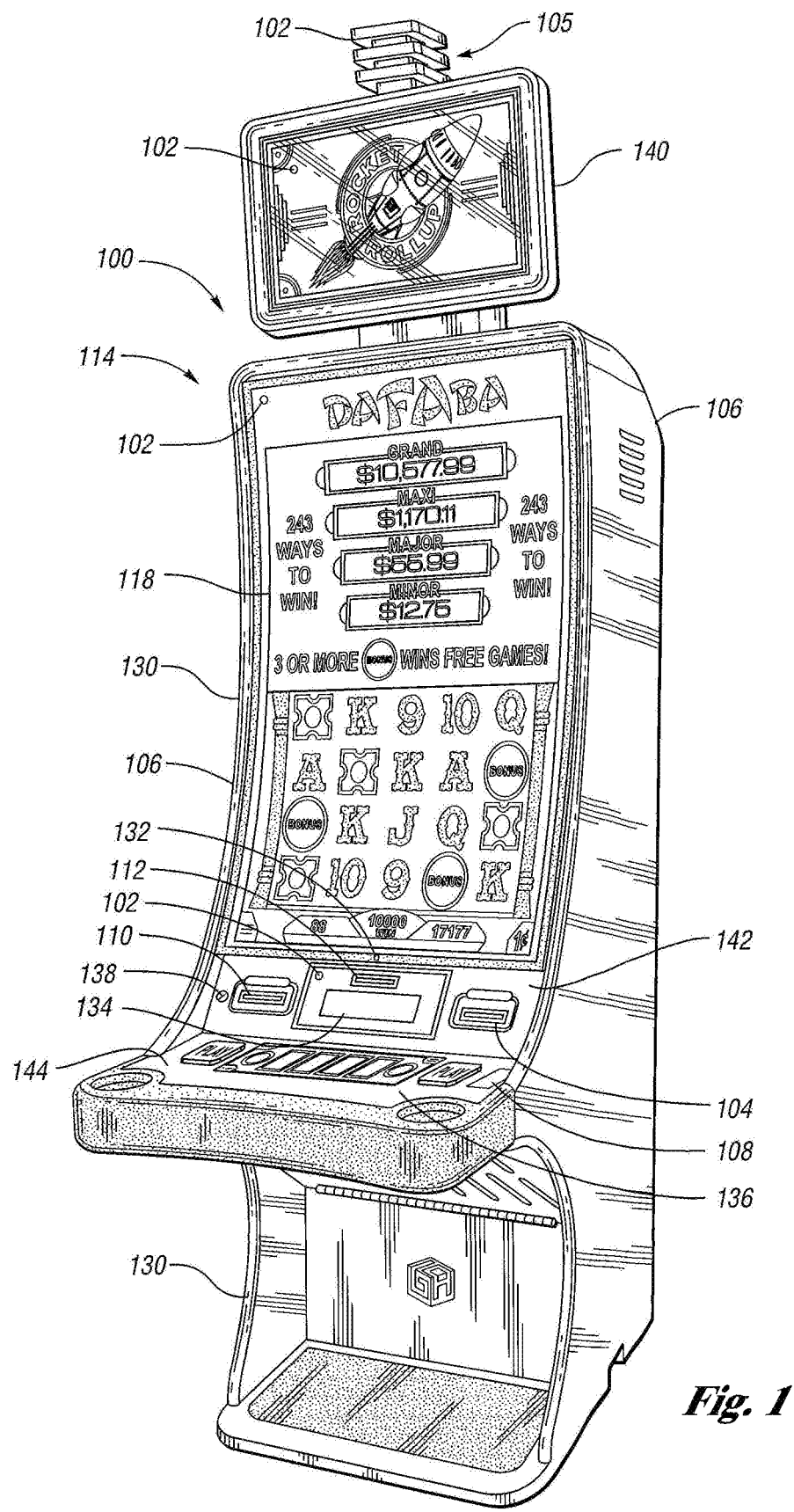
FIG. 1 illustrates a conventional electronic gaming machine including a curved game display.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed. While the present invention may be embodied in many different forms, as may be shown in the drawings and described herein in specific detail, this disclosure is to be considered as an exemplification of the principles of the invention as well as the best mode of practicing same and is not intended to limit the broad aspects or scope of the invention or claims to the specific embodiments illustrated or described.

One skilled in the art will recognize that the present invention is described below in such detail required to construct curved rigid support structures and rigid support structure assemblies for creating custom curvature of flexible displays and mounting to electronic gaming machines and the various embodiments of the present invention.

As will be appreciated by one skilled in the art, aspects of the present invention may be embodied as a system or method. Accordingly, aspects of the present invention may take the form of an embodiment combining software and hardware.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, solid state drives, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wired, wireless, wireline, optical fiber cable, RF, Bluetooth, near field communications, and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the EGM's computer, partly on the EGM's computer and partly on a remote computer or entirely on a remote computer or server as in a client/server relationship sometimes known as cloud computing. In the latter scenario, the remote computer may be connected to the EGM's computer through any type of network, including a local area network (LAN) or a wide area network (WAN), a combination thereof, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams.

FIG. 1 is an illustration of an exemplary electronic gaming machine (EGM) 100 that may be used with the systems described herein. In one embodiment, EGM 100 is a gaming device 114. EGM 100 may include one or more comp indicators 102, which may be incorporated into, or implemented by, a candle device 105, lighting element 130, displayed on flexible display 118, displayed on the player tracking module 134, displayed as an LED indicator on button panel 36 which is located on the button deck 144, or another device. One or more cameras 132 may be provided with or as part of the EGM 100 to capture images of the player or other aspects of game play. The button deck of hybrid or slant type EGMs generally projects outwardly from the main cabinet and may be horizontally disposed or at slight angles from horizontal and also serves as an armrest for the play. Button decks on upright type EGMs generally project out less from the main cabinet and may not contain enough room to serve as an armrest for the player. Button decks of bar top EGMs are located below the main game screen, closer to the player, with the armrest provided by the bar top itself or bar top armrest.

The EGM 100 includes one or more screens including a curved portrait mounted flexible display 118 although other screens or screen configuration may also be employed such as, flat screen, J-curve, reverse J-curve, S-curve multiple horizontal monitors, etc., as hereinafter described in greater detail. The flexible display 118 may be configured to display game content to the player or any other information regarding the game, the casino, rules, pay tables, promotions, advertisements, or any multimedia content. Additional lights 130 may be incorporated into the gaming machine to providing lighting for the player or ornamentation for the EGM 100.

A scanner 108 is provided to scan tickets which have bar or box codes, or for scanning money, cards, or any other media. In addition, scanner 108 may include other connectivity means such as blue tooth communications, near field communications or similar. Similar, a card reader 112 is provided to read one or more aspects of cards, such as player tracker or rewards cards, personal identification cards, and/or credit cards and is located on the peripheral deck 142. The EGM 100 may also include a printer 110. The printer may print on any type media depending on the printer capabilities. Any type content may be printed including but not limited to cash out tickets, coupons, gift certificates, comps, prizes, gaming codes, redemption codes, bar or box codes, receipt, or any other type of information. Also, part of this embodiment is a cash acceptor 104 configured to accept paper money, ticket-in-ticket-out vouchers, or any type physical item associated with the gaming machine 100. A USB port 138 or other type charging or I/O port is provided for phone charging or interfacing the user's phone to the gaming machine. Numerous other buttons and player interface elements are presented with the gaming machine to accept player input. The flexible display 118 may be configured as a touch screen if desired.

Figure 2:
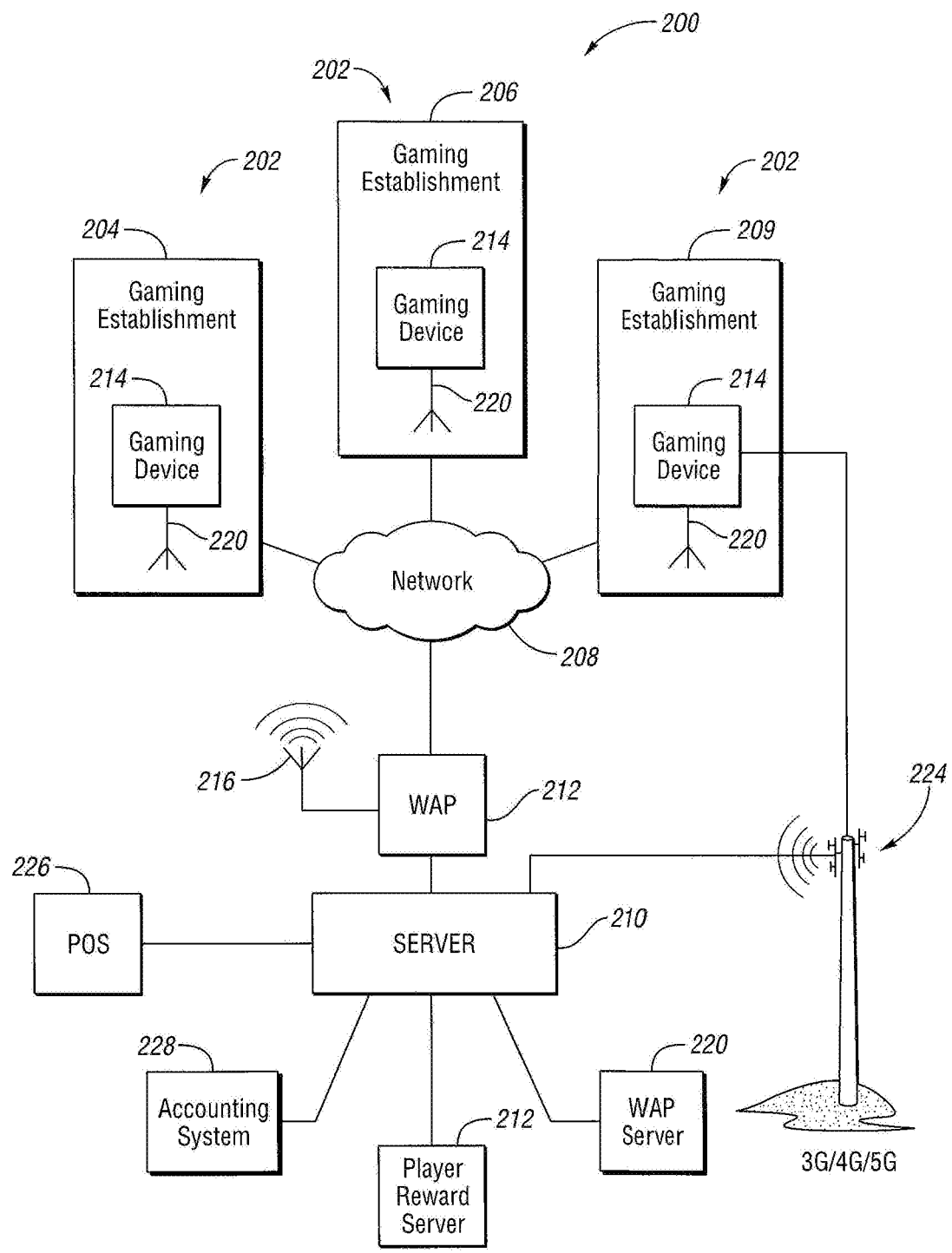
FIG. 2 illustrates a block diagram of a multiple casino property system of the type that may be used to facilitate the embodiments of the present invention.

FIG. 2 illustrates a block diagram of a multiple property system that may be used to play a game of chance. This figure provides a view of exemplary gaming systems in one or more casinos. In one embodiment, a plurality of gaming devices 214 are connected to one or more servers 210 over a network, such as a wide area network (WAN) and/or a local area network (LAN). In one embodiment, the gaming devices 214 are electronic gaming machines (EGMs), otherwise known as "slot machines." These may be classified as Class II, Class III, video lottery terminals (VLT), or the like. EGMs may present either one or a plurality of games to the player such as video reels, video poker, video keno, video bingo, electronic table games, and the like. In another embodiment, the gaming devices are gaming kiosks or terminals. The servers may include one or more local servers within a gaming establishment and/or one or more local area progressive (LAP) servers and/or one more wide area progressive (WAP) servers connected to the local servers and/or to the gaming devices through the network.

In one embodiment, each gaming device presents either one or a plurality of games of chance to a player to enable the player to select and play the games of chance. In addition, each gaming device may include a randomization device, such as a random number generator (RNG) and/or a permutation generator, that is used to play a selected game on the gaming device. The randomization device may be used to randomly determine a game outcome for the game of chance. For example, if the player selects a game of bingo to be played on a gaming device, the gaming device uses the randomization device to select a plurality of house indicia from a pool of indicia to be used during the game. In another embodiment, at least some aspects of the game are provided by one or more servers, such as a local server 210, a wide area server, a local area progressive server (LAP), or a wide area progressive server (WAP) 220. The server or servers may include a randomization device for randomly selecting the house indicia in the bingo game or any other wagering event.

In the example of a video poker game, either one or a plurality of games are presented to the player. After game selection and wagering, a number of playing cards, generally selected from a 52-card deck, are distributed to the player. In the case of draw poker or its many variants, the player selectively chooses to retain one or more of the original cards dealt and to discard those cards not chosen to be retained. The discarded cards are then replaced by new cards. If the player obtains a predefined winning combination of cards, the player wins an amount associated with the particular combination of cards.

In the example of mechanical, electromechanical, or video reel machines, the games may include a number of mechanical or simulated rotating reels that are arranged in a horizontal configuration forming columns or vertical configurations forming rows. Alternatively, simulated rotating reels may be arranged in a vertical configuration forming columns or vertical configurations forming rows. One or a number of rows are presented to the player to allow for one or many different winning pay lines. Pay lines may be straight across or designed in any convenient fashion. A typical game many include five reels or columns and three or four rows or the like or a vertical configuration of five rows and three or four columns and the like.

In the example of the bingo game, the house indicia are compared to a plurality of player indicia that are included within a pattern selected for one or more player cards. If at least some of the player indicia within the pattern are matched by the house indicia, the player may win a prize based on the number of house indicia that have been matched and an associated pay table.

In the example of a keno game or a keno-related game of chance, the gaming device uses the randomization device to randomly select a plurality of house indicia in a similar manner as described with respect to the game of bingo. However, twenty house indicia are typically randomly selected or called from a pool of 80 house indicia, although other sizes of house indicia pools may be used. The called house indicia are compared to a plurality of player indicia to determine how many player indicia are matched by the house indicia and may be irrespective of a pattern of the player indicia. The embodiments described herein may include allowing the player to select the number of and specific player indicia to be utilized for a keno game or may include an automated or quick pick selection. For example, a player may select one player indicia or spot to play a 1 spot game, 2 player indicia or spots for a 2-spot game, 3 player indicia or spots for a 3-spot game, etc. Embodiments may also require a minimum number of player indicia or spots to match to win a game. For example, 10-player indicia or 10-spot game may require a minimum of 5-player indicia or spots to match the randomly selected player indicia. Embodiments may also include a maximum number of player indicia or spots that are playable. For example, in an 80-number game, the maximum number of house indicia or spots selectable by the player may be confined to 20 numbers or less or a 20-number game or less. Accordingly, in an 80-number game, the minimum number of player indicia or spots may be 2 and the maximum player indicia or spots may be 20. The player may win one or more prizes based on the number of player indicia matched by the called house indicia.

As the player plays the games, the gaming device and/or a server or another computing device tracks data representative of the gameplay of the player (referred to herein as "gameplay data"), such as a theoretical win or loss, a past history, wager amounts, a number of plays per hour, wager amounts relative to an amount of time spent playing games on the gaming device, a number of wins or losses of the player, a cumulative amount wagered by the player, an amount of money won or lost by the player, and/or any other suitable data. The gameplay data is used to determine whether the player is eligible to receive a comp. The comp may include, for example, one or more free beverages, free meals, free tickets, reduced price meals or tickets, or the like.

In one embodiment, a comp indicator is included within, attached to, or displayed on the gaming device. The comp indicator may be energized or activated in any conventional way to indicate status including displaying on the game monitor, player tracking module or the like. The comp indicator is used to display to the player and/or to gaming establishment employees whether the player is eligible to receive the comp. If the gameplay data indicates that the player has reached a predetermined threshold of play and/or wagering activity, for example, the player is determined to be eligible to receive the comp. The comp indicator may then be activated to notify the player and/or gaming establishment employees that the player is eligible to receive the comp. The comp indicator activation may include any suitable means for displaying comp status, comp eligibility, change in comp status, incremental progress toward comps, continual progress toward comps, reduction in comp status after awarding of comps, etc., and may include any visual or sensory indicator or indication. Gaming establishment employees may then take action in response to the notification, such as by awarding the comp to the player. While the comp indicator is sometimes described as being a visual indicator, it should be recognized that the comp indicator may notify the player and/or gaming establishment employees using any suitable sensory perception, via printed comp tickets or the like.

A technical effect of the systems and methods described herein includes one or more of: (a) presenting a game of chance to a player on a gaming device; (b) enabling the player to input money or credits or physical items representing money or credits for use in the game of chance using a payment input device of the gaming device; (c) enabling the player to withdraw money or credits from the gaming device using a payment output device of the gaming device; (d) providing a comp indicator attached to or integrated within the gaming device, wherein the comp indicator is configured to provide an indication if the player is determined to be eligible for a comp; (e) generating gameplay data associated with the game of chance or skill-based game of chance for the player using the gaming device; (f) receiving input from the player at the gaming device to enable the player to play the game of chance; (g) randomly determining a game outcome for the game of chance using a randomization device; (h) transmitting the gameplay data from the gaming device to a computing device; (i) determining, by the computing device, whether the player is eligible for the comp based on the gameplay data; and (j) transmitting data representative of whether the player is determined to be eligible for the comp from the computing device to the gaming device.

Comp monitoring or accounting may also be monitored locally or remotely by management to ensure proper compliance. Systems and methods described herein may be self-contained within a gaming device or may reside in a server-based system such as a slot accounting system (SAS).

As used herein, a "game of chance" or "game" refers to a manual or an electronic game that is played by a player in which an outcome of the game of chance is at least partially based on chance or a random selection of game components or skill-based game components. A game may be categorized by a game variety and/or a game size, for example. It should be recognized by one of ordinary skill in the art that the term "random" is not limited to true randomness, such as truly random numbers. Rather, pseudorandom numbers and pseudorandom algorithms are included within the meaning of "random." In addition, one of ordinary skill in the art will recognize that permutation generators may additionally or alternatively be used to generate player card indicia or other game components.

Gaming devices described herein may use real money for play or may utilize a credit-based system in which the credits used for the games may or may not have a cash value. Similarly, prizes for the games may be in the form of credits, cash, and/or physical prizes such as televisions, automobiles, or the like.

A "local game" is a game that is played by players within a predetermined location, such as within a single gaming establishment, or players playing the game across a local area network. A "local prize" or a "local payout" (including a local progressive prize or a local progressive payout) is a prize that may be won during a local game.

As used herein, the terms "connect" and "couple" are not limited to only including direct connections. Rather, unless otherwise specified, indirect connections are included within the definitions of "connect" and "couple." For example, two devices may be considered to be connected together even if there are other devices or components connected between the two devices.

A player reward card refers to a physical or electronic card, token, or other device or data that enables a system to identify a player in connection with, among other things, a reward program or campaign. Accordingly, the player reward card may serve to identify the player and may enable gameplay, credits, funds, or other data to be associated with the player. In addition, player card tier levels may be established to denote the level of player play or relative worth to the casino operator.

Shown in FIG. 2, the block diagram of system 200 may be used to play one or more games of chance, such as video poker, video slots, sports betting, bingo, keno or any the wagering game. The games of chance may be played by a player against other players or may be played by the player against the house.

System 200 is operated using components and devices within one or more gaming establishments 202, such as a first gaming establishment 204, a second gaming establishment 206, and a third gaming establishment 209. It should be recognized that any suitable number of gaming establishments 202 may be provided within system 200. Accordingly, system 200 is not limited to including three gaming establishments 202 as illustrated. In one embodiment, gaming establishments 202 are locations in which devices (e.g., gaming devices) that play or operate at least a portion of the game of chance are located. For example, gaming establishments 202 may be casinos, racetracks, bingo halls, keno parlors, or any other gaming establishments. In another example, gaming establishments 202 may be a businesses in which one or more devices are located for playing or operating the game of chance. Gaming establishments 202 may additionally or alternatively include any combination of the examples described herein.

In one embodiment, gaming establishments 202 are physically remote from each other and are communicatively connected to at least one network 208, such as a wide area network (WAN), a metropolitan area network (MAN), and/or the Internet, for example. Alternatively, the gaming establishments 202 may be separate rooms or sections of a casino or another facility that are communicatively connected by network 208. It should be recognized that network 208 may be a wired Ethernet network, a wireless Ethernet network, a combination of wired and wireless Ethernet networks, or any other suitable wired and/or wireless network.

In one embodiment, each gaming establishment 202 includes a local game server 210 (referred to herein as a "local server") and a player reward server 212. Local server 210 and player reward server 212 may alternatively be implemented as or within a single server. The local server 210 is coupled to a plurality of the gaming devices 214 through an internal network 208, such as a private local area network (LAN) within the gaming establishment 102, for example. The gaming devices 214 may be located in separate gaming establishments 202, or within the same gaming establishment 202.

In one embodiment, the local server 210 is a server computer (or "server") that monitors and controls the games played on gaming devices 214, including local games. In one embodiment, the local games include games that are played against the house and/or that are played against other players In addition, the local server 210 may administer other background tasks that enable games to be played on the gaming devices 214. For example, the local server 210 may facilitate authenticating gaming devices 214 and the players using the gaming devices 214 and may facilitate allocating payments or credits between players and the house. The local server 210 may include payment processing capabilities to enable players to receive electronic funds from a bank or another financial institution or to deposit electronic funds to the bank or financial institution. Alternatively, the payment processing capabilities may be included in a separate server or another device that is communicatively connected to the local server 210. In addition, the local server 210 may interface with the player reward server 212 to facilitate tracking and administering player rewards. Each gaming device 214, group of gaming devices 214, local servers 210, player reward servers 212, or the like may collect and/or generate data desired for accounting purposes, such as for use in slot accounting systems.

In one embodiment, the local server 210 may enable the gaming devices 214 within the gaming establishment 202 to participate in one or more games that share one or more progressive or pari-mutuel prizes with other gaming establishments 202 and/or gaming devices 214. While progressive prizes are described in embodiments herein, it should be recognized that pari-mutual prizes may be substituted as desired, and vice versa. In such an embodiment, each local server 210 may be coupled to a wide area progressive (WAP) server 220 that administers the prizes. For example, the WAP server 220 receives data from each local server 210 and/or from gaming devices 214 regarding an amount wagered by each player playing the game. WAP server 220 may allocate a portion of each wager to the prizes and may communicate the current prize amounts to local servers 210 and/or to the gaming devices 214.

One or more point-of-sale ("POS") terminals 226 or redemption kiosks may also be included within each gaming establishment 202 to enable players to "cash out" winnings from one or more gaming devices 214 and/or to perform other account management activities related to player accounts. The POS terminals 226 may be connected to the local server 210, for example, and/or to the WAP server 220 as desired.

In addition, the system 200 may include an auditing system 228 coupled to WAP server 220, the local server 210, and/or a gaming device 214, for example, through network 208. Accounting (auditing) system 228 may be used to audit and/or track components of system 200 to ensure compliance with applicable regulations.

In one embodiment, a plurality of gaming devices 214 having different operating systems and/or system architectures may connect to the local server 210 or to another suitable server to play one or more games of chance. In such an embodiment, the gaming devices 214 may be used to play a session bingo game, for example, or any other game of chance.

During operation, the player utilizes or selects a gaming device 214 and initiates a gaming session for playing one or more games of chance ("Games"). Optionally, the player inserts a player reward card or enters a player reward number or other identification information into gaming device 214. If the identification information is entered, the gaming device 214 may transmit the identification information to local server 210 for authentication, or authentication may be accomplished locally within the gaming device 214. The local server 210 communicates with player reward server 212 to establish the player's identity and to associate the gameplay with the player account. The local server 210 authenticates the player and gaming device 214 and authorizes the player to play the game or games on gaming device 214 if desired or required.

When game play is initiated, during selection of the game, or during play of the game, the player may be required to purchase or generate credits. The player may purchase or generate credits by inserting cash or a ticket-in-ticket-out voucher into gaming device 214 or another device. Cash, ticket-in-ticket-out vouchers, credit cards or debit cards are examples of physical items associated with the gaming device. Alternatively, or additionally, the player may transfer credits or cash to the gaming device 214 from banking accounts, credit accounts, gaming establishment accounts, and/or gaming company accounts. In one embodiment, computer-generated credits may be used with gaming device 214, for example, as part of a free-to-play game.

The player selects a game to play and enters a wager on the gaming device 214. The gaming device 214 transmits data representative of the selected game and the wager to the local server 210. If the player selects a game that is at least partially operated by the WAP server 220 or that includes one or more progressive prizes administered by WAP server 220, local server 210 transmits the wager and game information and/or selection to WAP server 220. The WAP server 220 may increment the progressive prizes based on the wager received from the player and may communicate the updated prize amounts via the network 208 to all other players (via associated gaming devices 214) playing to win the progressive prizes.

The player plays the game on the gaming device 214. The following gameplay is described as being administered by the WAP server 120. However, it should be recognized that the gameplay (i.e., the play of the game of chance) may be alternatively or additionally administered by the local server 210 and/or the gaming device 214. In one embodiment, the player may play a game of bingo by selecting a game or game type, one or more player cards, selecting one or more winning patterns for the player cards, and/or selecting one or more numbers or other player indicia for the player cards using the gaming device 214. The selected player cards, winning patterns, and player indicia are transmitted to WAP server 220. The player cards are included within one or more game tickets issued by WAP server 220, and the game tickets are communicated to the gaming device 214 via the network 208 and the local server 210. The WAP server 220 selects or receives randomly generated house indicia and compares the house indicia to the player indicia and the pattern or patterns selected for the player cards. Alternatively, the functions described herein (e.g., comparing the house indicia to the player indicia and the pattern or patterns selected for the player card) may be performed in the gaming device 214. It should be recognized that the house indicia may be randomly generated using a randomization device, such as hardware, firmware, and/or software-based random number generator (RNG), a ball blower or console, a ball cage, and/or any other suitable device or machine that enables numbers or other house indicia to be randomly generated. In an alternative embodiment, the WAP server 220 (or another device) may designate a server, computer, or another device to provide randomly selected house indicia during the game and may receive the house indicia from the designated device.

WAP server 220 determines whether the player wins a prize based on the comparison of the house indicia to the player indicia. For example, WAP server 220 determines whether the player indicia within the pattern or patterns selected for each card match the house indicia that were randomly determined (sometimes also referred to as the house indicia that were "called"). If the player indicia within a pattern match the called house indicia, the player may win a prize based on a pay table associated with the game. The prize may be one of the progressive prizes or the prize may be a fixed prize identified in the pay table. WAP server 220 determines the appropriate payout to be paid to the player based on the pay table and transmits data representative of the payout to local server 210.

Local server 210 receives the payout data and credits the player account accordingly. In addition, local server 210 may transmit the gameplay data and/or payout data to player reward server 212 to enable player reward server 212 to update the player history and other gameplay data for the player. When the player is done playing, the player may "cash out" some or all of the credits in the player account or may deposit the credits into the player account using POS terminal or kiosk 226, for example. The player account may be stored on gaming device 214, local server 210, or player reward server 212, for example.

In one embodiment, the player may enter the wager and/or may initiate play of the game on a first gaming device 214 and may complete the gameplay on a second gaming device 214. Alternatively, the player plays the game on the first gaming device 214 and receives the results of the gameplay (e.g., whether the player won and how much the winnings are) on the second gaming device 214. For example, the player may begin playing the game on a kiosk or electronic gaming machine, and may complete the game or view the results of the game on a cell phone. In such an embodiment, the WAP server 220 and/or local server 210 may transmit the player's gameplay data from the first gaming device 214 to the second gaming device 214.

Figure 3:
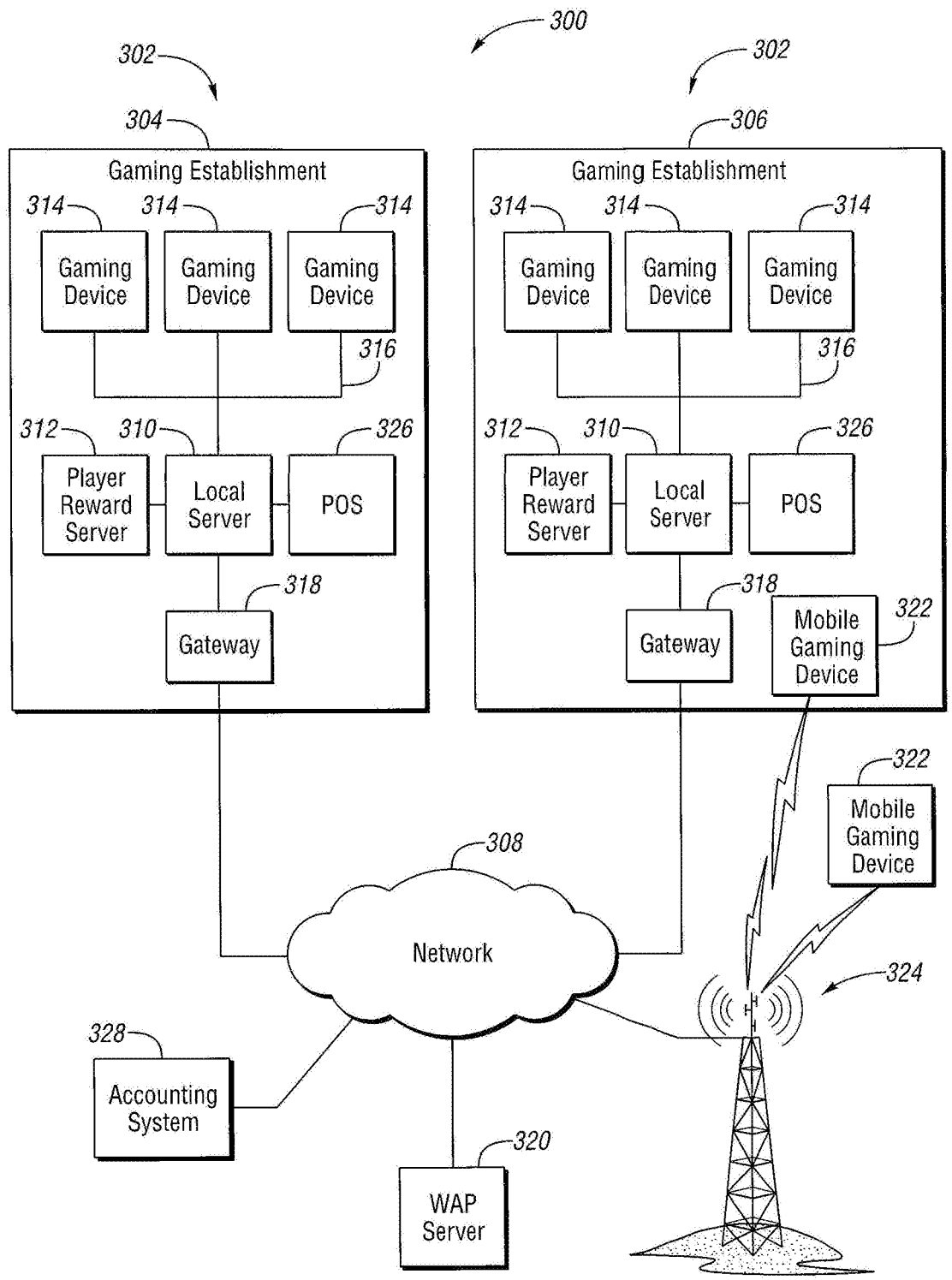
FIG. 3 illustrates a block diagram of a wireless network system of the type that may be used to facilitate the embodiments of the present invention.

FIG. 3 is a block diagram of another system 300 that may be used to play one or more games of chance, such as a slot, bingo, keno, or any game of chance. Unless otherwise specified, the system 300 is similar to system 100 (shown in FIG. 1). It should be understood that more or less components may be included within the various embodiments described herein.

In the embodiment shown in FIG. 3, the system 300 includes a plurality of gaming devices 314 that are positioned in a plurality of gaming establishments 302. Gaming devices 314 may connect to a server 310 through a wireless access point 318. The wireless access points 318 includes an antenna 324 configured to wirelessly transmit to and receive signals from antennas 324 associated with the gaming devices 314. Wireless communications systems and methods are understood by one of ordinary skill in the art and as such are not described in detail here. For example, the gaming devices 314 may be playing one or more stand alone or Internet-based games that connect to the WAP server 320 through a server 310. In some embodiments, one or more gaming devices 314 may connect to the WAP server 320 and/or to the player reward server 312 through a wireless data network as described above. Accordingly, the gaming devices 314 interact with WAP server 320 to play the game, and WAP server 320 performs the game administration and other tasks handled by local server 310 as described above in FIG. 2. In a similar manner, a POS terminal 326 may connect to a gaming device 314 and/or WAP server 320 via network 308. In other respects, system 300 performs in a similar manner as described above.

During operation, the player utilizes or selects a gaming device 314 and initiates a gaming session to play one or more games on the gaming device 314. The player inserts a player reward card or enters a player reward number or other identification information into the gaming device 314. Such other identification means may include, facial recognition, voice recognition, retina scan identification, finger prints, palm prints, mobile device communication, etc. The gaming device 314 transmits the identification information to player reward server 312 to establish the player's identity and to associate the gameplay with the player account. The player reward server 312 authenticates the player and the gaming device 314 and may authorize the player to play the game on the gaming device 314. In one embodiment, the gaming device 314 also transmits the identification information to the WAP server 320 to enable the WAP server 320 to associate the player with the game to be played. As previously described, player identification or authentication may be optional.

In another embodiment, the WAP server 320 authenticates the player using the player identification information in addition to, or instead of, the authentication performed by the player reward server 312. In some embodiments, the player reward server 312 is omitted and the functions of player reward server 312 are incorporated within WAP server 320.

The player selects a game to play and enters a wager using gaming device 314. If the player selects a game that is operated by the WAP server 320 or that includes one or more progressive prizes administered by the WAP server 320, the gaming device 314 transmits the wager and game selection to the WAP server 320. The WAP server 320 may increment the progressive prizes based on the wager received from the player and may communicate the updated prize amounts over the wireless channel via the network 308 to all other players (via associated gaming devices 314) playing to win the progressive prizes.

Although shown as a wireless network, it is contemplated that the same functionality may be implemented in a wired system, or a combination of both.

The player plays the game on gaming device 314. The following gameplay is described as being administered by the WAP server 320. However, it should be recognized that the gameplay may be alternatively or additionally administered by the gaming device 314. For example, if the gaming device 314 is a cellular phone or a tablet computing device, the gameplay may be administered through an application installed on gaming device 314.

Figure 4:
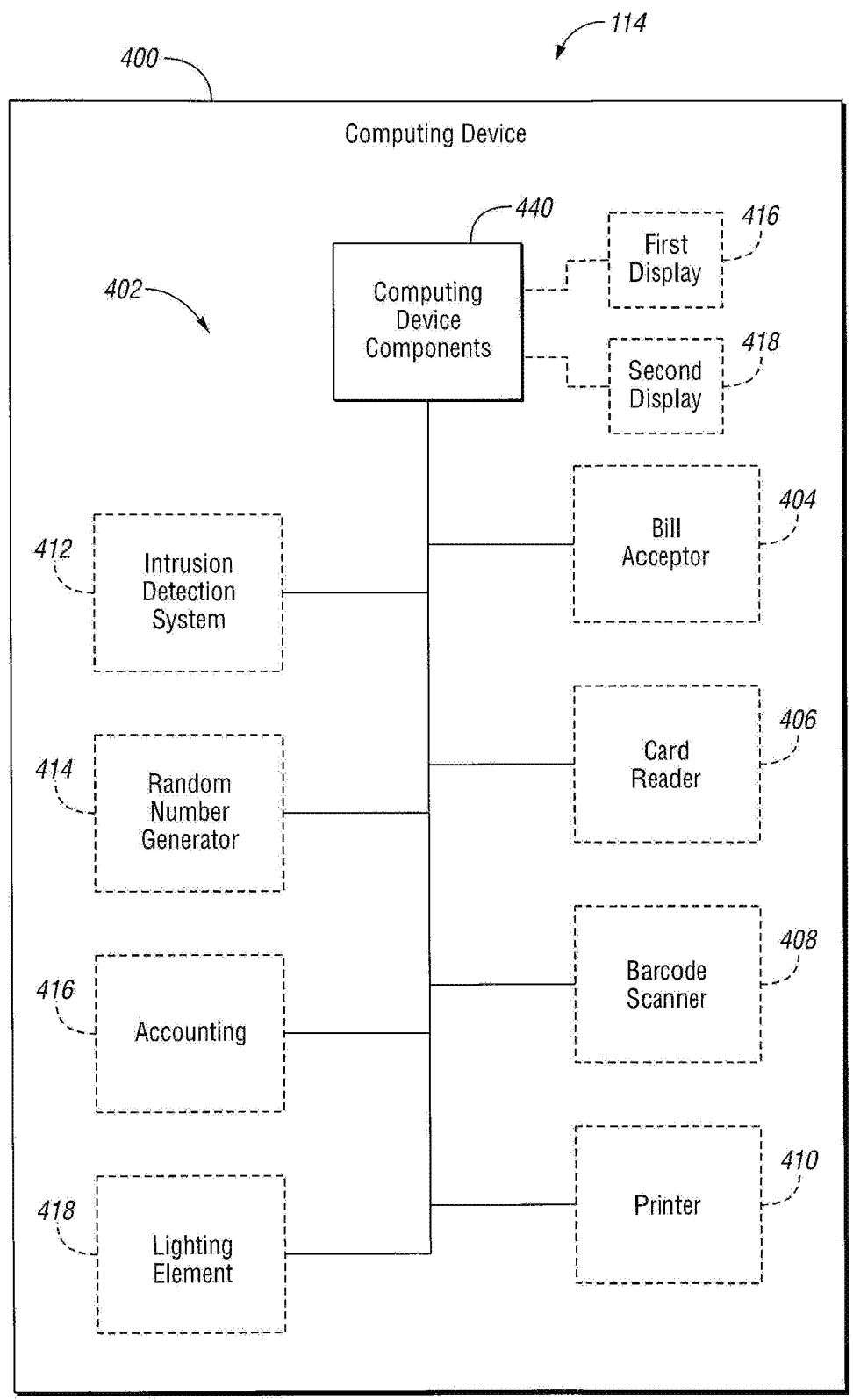
FIG. 4 illustrates a diagram of exemplary gaming device hardware of the type that may be used to facilitate the embodiments of the present invention.

FIG. 4 is a block diagram of a gaming device 114 that may be used with system 100 (shown in FIG. 1). As described above, the gaming device 114 is a computing device 400 (such as an EGM) that includes a plurality of computing device components 402 positioned within a cabinet or other housing. In one embodiment, computing device component manager or processor 440 include first display 416 and second display 418. In addition, gaming device 114 may include a plurality of gaming device components 402 including a bill acceptor or bill validator 404, a card reader 406, a barcode scanner 408, a printer 410, an intrusion detection system 412, a randomization device 414 (such as an RNG), and an accounting interface 416 that are positioned within, or coupled to, the cabinet or housing of the gaming device. In one embodiment, gaming device 114 may also include at least one lighting element 418 coupled to the cabinet or housing.

It should be recognized that in some embodiments, a gaming device 114 may not include each gaming device component 402 illustrated in FIG. 4. In some embodiments, the gaming device may not include bill acceptor 404, card reader 406, barcode scanner 408, and/or printer 410. Rather, in some embodiments, the functions of each omitted gaming device component may be replaced by equivalent software, hardware, and/or firmware if desired. Optional components may be designated using dashed lines in the figures.

The bill acceptor 404, also known as a bill validator, is a payment input device that enables gaming device 114 to receive and identify paper currency, ticket-in-ticket-out vouchers, or other physical items representing a monetary value. For example, bill acceptor 404 may receive and identify dollar bills or other currency that are inserted into bill acceptor 404. In one embodiment, bill acceptor 404 includes a scanner that scans paper currency inserted therein. The bill acceptor 404 may also include optical character recognition (OCR) capabilities that enable bill acceptor 404 to identify the amount of currency inserted into bill acceptor 404 from a scanned image of the currency. The bill acceptor 404 may transmit data representative of the amount of currency inserted into gaming device 114 to controller or processor 440, for example. The controller or processor 440 may cause the amount of currency to be converted into credits usable with the game and may add the credits to the player's account.

The card reader 406 is a device that "reads," or obtains data encoded in, player reward cards or other cards or media that are inserted into reader. In one embodiment, the card reader 406 is a magnetic or optical card reader that reads barcodes or magnetic strips included within a player reward card. In another embodiment, the card reader 406 wirelessly reads data encoded within the player reward card by accessing a chip, such as a radio frequency identification ("RFID") chip, embedded within the card or other similar authentication means. The card reader 406 reads the data obtained from the cards and transmits the data to the processor 440. In one embodiment, the card reader 406 is used to read player identification information encoded within player reward cards. The controller or processor 440 may transmit the player identification information to player reward server or other external component to identify the player, track past or present player activity, to allow for the transfer of funds or credits, to facilitate authenticating the player, and/or to authorize the player to play a game on gaming device 114. In one embodiment, the player may "log in" to the gaming device 114 by swiping the player reward card or otherwise passing the player reward card through or inserting the player reward card into the card reader 406. In another embodiment, the player may enter a number or other identifier associated with the player reward card into the gaming device 114, through the user interface devices for example, instead of using the card reader 406. In another embodiment, the insertion of the player reward card and player entering the identifier into user interface device may be combined. In yet another embodiment, the player may use a near field communication (NFC) device to read the player reward card or data representative of the player card. Alternatively, the player reward card may be associated with an application on a cell phone or tablet which wirelessly communicates with the card reader or similar system.

In one embodiment, the barcode scanner 408 is an optical or a magnetic scanner that is optimized to read barcodes on media positioned proximate to the scanner and may also include RFID sensors, blue tooth connectivity, near field communications devices, etc. For example, the barcode scanner 408 may be optimized to read barcodes printed on paper receipts (sometimes referred to as "tickets" or vouchers, not to be confused with game or player tickets that may include player selected patterns, player indicia, and the like) and/or barcodes displayed electronically on a cell phone or tablet computing device. It should be recognized that the barcodes read by the barcode scanner 408 may be linear or one-dimensional barcodes, two-dimensional barcodes, or may even include data represented in a form other than a barcode. For example, the barcode scanner 408 may read images and/or text indicative of data, such as currency or credits, usable with gaming device 114. The barcode scanner 408 extracts the data from the barcode and transmits the data to controller/processor 440. For example, the barcode scanner 408 may scan a paper receipt or voucher that includes an amount of currency or credits usable by the player with a gaming device 114 and may transmit the amount of credits to the controller/processor 440. In such an example, the barcode scanner 408 may act as a payment input device. The controller/processor 440 may cause the amount of currency or credits to be displayed to the player on first display 416 (or on any display) to inform the player how many credits or currency is available to be used in playing a game.

The printer 410 may be used to print paper receipts (also known as tickets as described above), ticket-in-ticket-out vouchers, or other physical items representing a monetary value that indicate an amount of currency or credits available to the player. In many locations, the tickets or receipts may alternatively be referred to as vouchers. The printer 410 may act as a payment output device that enables a player to cash out or withdraw money or credits from the gaming device 114 by printing a voucher representative of the money or credits. In one embodiment, the printer 410 is a thermal printer that is fed by a roll of paper or any suitable paper stock. In a further embodiment, the roll of paper includes one or more watermarks that are visible when the printer 410 has printed the receipt on the paper. Alternatively, the printer 410 may print the watermark on the receipt, or may include another security mechanism to facilitate preventing counterfeit receipts from being made. For example, the printer 410 may include an image or a code on the receipt that identifies the gaming device 114, the printer 410, or another component of the gaming device along with a time that the receipt was printed, serial number, date, location, or other desired information. Other suitable security mechanisms may be used as well. It should be recognized that the barcode scanner 408 and the printer 410 may cooperate such that a security mechanism printed on the receipt may be received and validated by the barcode scanner, in conjunction with controller/processor 440, for example. The barcode scanner 408 may be located remotely from the gaming device 114, such as within a redemption kiosk, a casino cage, or the like.

The intrusion detection system 412 notifies the controller/processor 440 if a case, cabinet, or other housing enclosing components of the gaming device 114 is opened or modified without authorization. In one embodiment, the intrusion detection system 412 includes a pair of contacts that may be physical, magnetic, optical, or similar that transmit an electronic signal to the controller/processor 440 if the housing of the gaming device 114 is opened (e.g., if the opening of the housing separates the contacts). In another embodiment, the intrusion detection system 412 may include a light sensor that detects a change in the light within the housing of the gaming device 114. The intrusion detection system 412 may also include a key or another mechanism for disabling the operation of the game or transmission of the signal to the controller/processor 440 in the event that maintenance or other authorized or unauthorized access to the gaming device 114 components is desired or occurs.

In one embodiment, the intrusion detection system 412 includes a software program (a "monitoring program") that monitors one or more applications installed on the gaming device 114. For example, if the gaming device 114 is a cell phone that includes an application for playing the game thereon, the monitoring program may monitor the application to determine whether the application is modified without authorization. In one embodiment, the monitoring program stores a hash value or a digital fingerprint of the application when the application is installed and/or when the application undergoes authorized modification (e.g., if the application is updated or patched). However, if the monitoring program determines that the application has been modified without authorization, the monitoring program may cause a signal or another notification to be transmitted to the controller/processor 440. For example, the monitoring program may periodically calculate a new hash value of the application and/or create a new digital fingerprint of the application. The monitoring program then compares the new hash value and/or digital fingerprint to the stored hash value and/or digital fingerprint. If the hash values or fingerprints are different, the monitoring program may determine that the application has been modified without authorization. It should be understood that the hash value, the monitoring program, and/or the digital fingerprint may be generated by any suitable means and may be encrypted for additional security.

In response to the signal or notification from the intrusion detection system 412 and/or the modification program, the controller/processor 440 may perform one or more actions. For example, the controller/processor 440 may alert an administrator within gaming establishment by transmitting a message via communication device, may cause audio output device to emit an alarm or another audible alert, may cause a display 416, 418 to display an error or a warning, message, and/or may disable the application and/or the gaming device 114 such that the game is unable to be played on the gaming device.

In one embodiment, the randomization device is an electronic random number generator (RNG) or pseudo random number generator (PRNG) 414 or a permutation generator that may be implemented by a dedicated hardware device with associated embedded software. Electronic random number generators or pseudo random number generators are used interchangeably herein. Alternatively, the RNG 414 or the permutation generator may be implemented entirely in software executing on gaming device 114. The RNG 414 may be used to randomly determine a game outcome for the game of chance. In one embodiment, the RNG 414 or the permutation generator provides house or game draws of between 1 and n numbers, where n may be a suitable number based on the game type selected to be played by the player. The RNG 414 or the permutation generator may be programmed via hardware, software, or firmware to provide a particular range of numbers (or other indicia) and numbers of draws for a particular application. For example, in one embodiment of bingo according to the present disclosure, the RNG 414 or the permutation generator initially provides 24 randomly generated numbers having values between 1 and 75 for each game. In other embodiment other methods or numeric values may be used. Additional draws or numbers may be provided to play the game to conclusion depending on the particular implementation as described in greater detail herein. In addition, the RNG 414 or the permutation generator may be used to randomly select a plurality of player indicia to be used with one or more player cards. In embodiments in which a processor, such as controller/processor 440, is described as randomly selecting indicia, it should be recognized that controller/processor may interface with randomization device 414 or the permutation generator to select the indicia. In other embodiments, controller/processor 440 may include randomization device 414 or the permutation generator, or may execute instructions to perform the functions of randomization device 414 or the permutation generator.

The accounting interface 416 is used to interface with an accounting system, such as a slot accounting system, at or operated by a gaming establishment. Accounting interface 416 may include or be connected to a network interface, such as the communication device 308 for use in communicating gameplay data, player identification information, and/or other data to the accounting system for accounting and/or auditing purposes.

The lighting element 418 may include, for example, one or more LEDs, slot machine candles, fluorescent tubes, and/or any other element that emits light as controlled or directed by the controller/processor 440. In one embodiment, the lighting element 418 is activated to display light, or one or more lighting patterns, when the controller/processor 440 determines that a winning ticket was scanned via the card reader 406 or when the controller/processor otherwise determines that a ticket is a winning ticket. The lighting elements 418 may also be activated upon receipt of a signal from the intrusion detection system 412 (e.g., upon the determination that the gaming device 114 has been opened and/or modified without authorization) and/or upon any other suitable determination.

In one embodiment in which the gaming device 114 or kiosk may interface with another gaming device operated by or otherwise associated with the player, such as a cell phone, tablet, or another mobile device. For example, the gaming machine or kiosk may be configured to transmit a result of one or more games of chance to the player's mobile device to notify the player whether one or more player cards or game tickets are winning cards or tickets.

Figure 5:
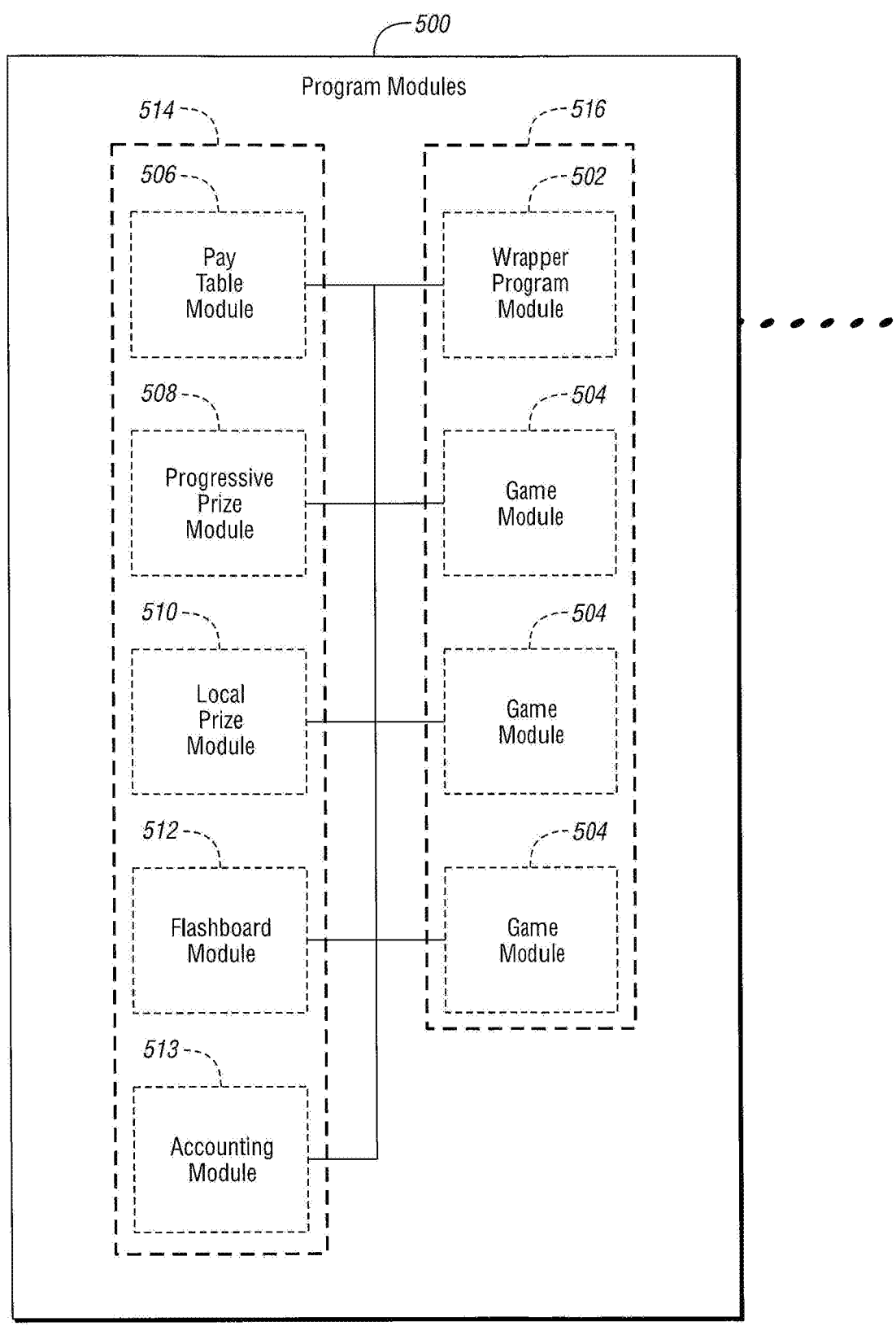
FIG. 5 illustrates a diagram of gaming device program modules of the type that may be used to facilitate the embodiments of the present invention.

FIG. 5 is a block diagram of a plurality of program modules 500 that may be used with the systems shown and described herein to administer one or more games of chance. In one embodiment, one or more program modules 500 are installed and/or stored within local server, WAP server, and/or gaming devices. For example, program modules 500 may be stored in memory device of local server, WAP server, and/or gaming devices.

The program modules 500 are hardware, firmware, or software programs or applications that, when executed by a processor, cause the processor to perform the functions described herein. In one embodiment, the program modules 500 include a wrapper program module 502, a plurality of game modules 504, a pay table module 506, a progressive prize module 508, a local prize module 510, a slot or flashboard module 512, and/or an accounting module 513. A first plurality 514 of the program modules 500 may be installed within each local server and/or WAP server and a second plurality 516 of the program modules 500 may be installed within each gaming device. It should be recognized that in embodiments in which the game of chance is administered by a gaming device, some or all of the first plurality 514 of program modules 500 may be incorporated within gaming device and executed by a processor of a gaming device. Alternatively, some or all of the second plurality 516 of the program modules 500 may be incorporated within a local server and/or WAP server. Together, the wrapper program module 502, the game modules 504, and the other program modules 500 that present and/or administer one or more games may be referred to herein as a game application, or an application.

In one embodiment, the wrapper program module 502 is used at least in part to provide a graphical user interface ("GUI") on a first display of the gaming device. The wrapper program module 502 operates to provide an entry point or a game entry interface for a player to access the gaming device, and to enable the player to select a game of chance to be played on the gaming device. For example, the games of chance may be categorized into a plurality of game sizes and a plurality of game variations. The wrapper program module 502 may present the game sizes and the game variations to the player, using a display, and may enable the player to select a game to play by selecting a game size and game variation through user interface device.

In one embodiment, the wrapper program module 502 may present a list of games or game variations to the player for selection on a display. If the player selects a size and variation, wrapper program module 502 calls or branches to a game module 504 that provides the selected game and variation.

In one embodiment, the game modules 504 each provide a game associated with the selected game size and/or game variation to the player using gaming device, local server, and/or WAP server. Accordingly, in one embodiment, each game is provided by a separate game module 504. Alternatively, each game module 504 may provide more than one game to the player.

The pay table module 506 provides a pay table associated with each game such that one or more pay tables may be associated with each game module 504. In one embodiment, the pay table module 506 provides a pay table associated with a game when the game module 504 requests the pay table and/or when a predetermined event occurs during the game. The pay tables associated with a game may be changed as desired by a game operator by any suitable means. The predetermined event may include, for example, the player selecting a "See Pays" or another icon displayed on the display that represents a request to view the pay table for the game. The predetermined event may also include reaching a point in the game in which the house indicia are matched to the player indicia within a selected pattern to determine whether the player wins a prize.

The progressive prize module 508 may be used to administer aspects of one or more progressive prizes, such as one or more progressive prizes offered to players playing across network. For example, the progressive prize module 508 may receive information regarding an amount wagered by each player playing a game that has a chance to win the progressive prize. The progressive prize module 508 may allocate a first portion of each wager to a first progressive prize to increase the size of the progressive prize. The progressive prize module 508 may allocate a second portion of each wager to a second progressive prize, and may continue in a similar manner for any additional progressive prizes, if desired or applicable. Accordingly, a plurality of progressive prizes may be provided for each game and may be at least partially funded by each or selected wagers.

The local prize module 510 may be used to administer aspects of one or more local prizes, such as one or more prizes that may be won by players playing against each other within a gaming establishment. In addition, the local prize module 510 may administer aspects of one or more fixed prizes, such as prizes that may be won only by individual players playing on respective gaming device. Accordingly, fixed or individual prizes may be awarded to a player based on the gameplay of the player relative to a randomization device of gaming device, rather than based on winning against other players.

In one embodiment, the slot or flashboard module 512 may be used to control and conduct slot games in the manner and for the purposes detailed below.

The accounting module 513 may be used to interface with an accounting system, such as a slot accounting system or auditing system, at or operated by a gaming establishment. In one embodiment, the accounting module 513 is incorporated within, or executed by, accounting interface. Any suitable data, such as gameplay data, player identification information, prizes won by a player, and/or any other suitable data may be collected and transmitted by the accounting module 513.

It should be recognized that two or more program modules 500 may be combined together such that the functionality of each program module 500 is incorporated into the combined module. Likewise, each program module 500 may be split into two or more sub-modules that each perform a portion of the functionality of the program module 500 being split. Accordingly, while the above-described program modules 500 are described individually, each may be combined or split into other sub-modules as desired.

Figure 6:
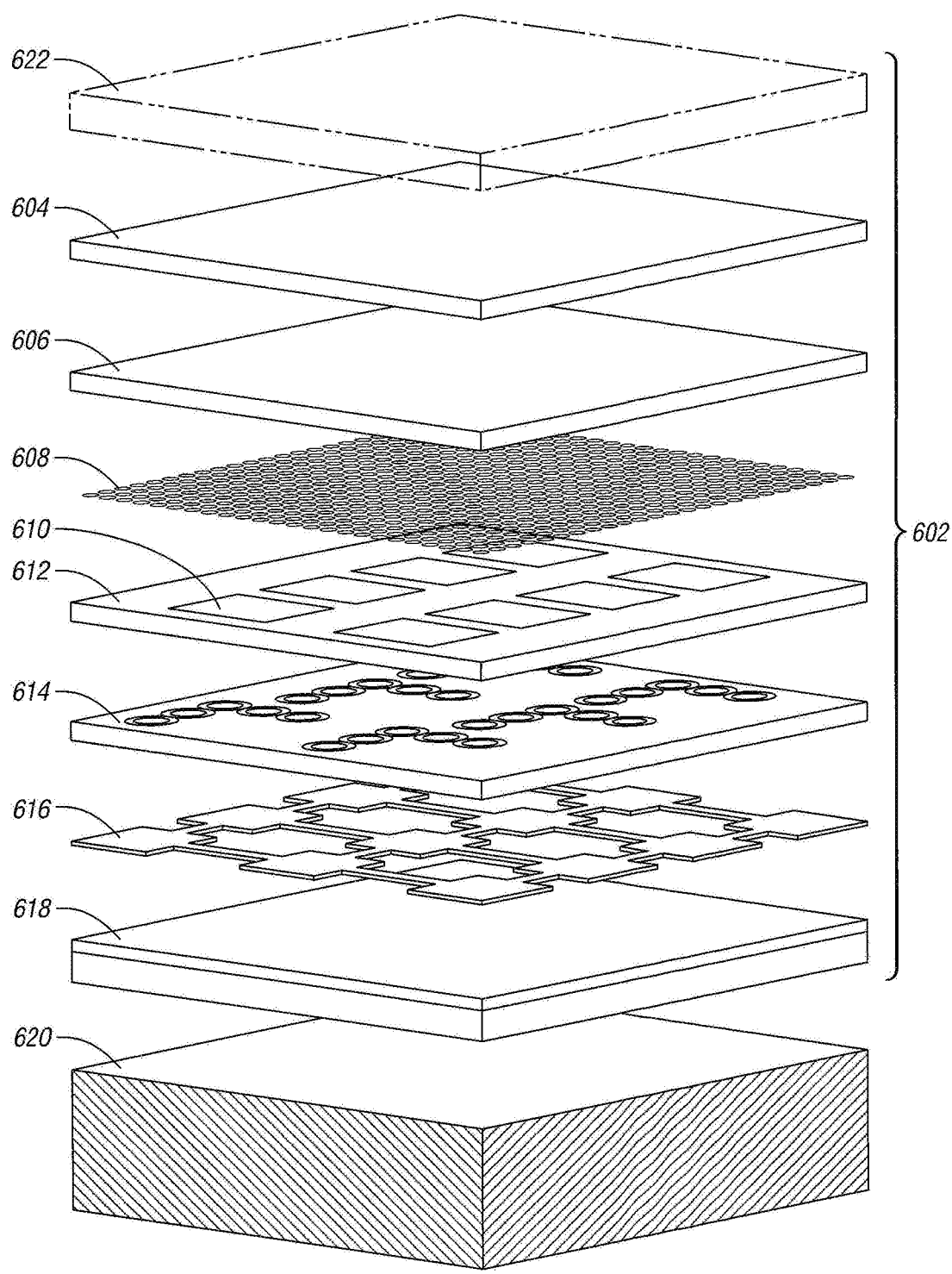
FIG. 6 illustrates an exploded perspective schematic view of a typical flexible display mounted on the rigid support structure of the present invention.
Figure 7:
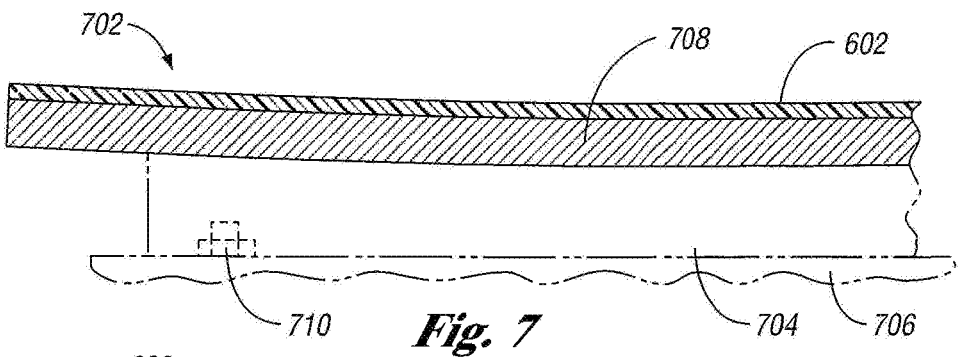
FIG. 7 illustrates a schematic partial cross-section view of a typical flexible display mounted on the rigid support structure of the present invention.

FIG. 6 is an illustration of an exploded perspective schematic view of a typical flexible display 602 mounted on the rigid support structure of the embodiments of the present invention. The flexible display 602 includes an encapsulation layer 604. cathode 606, phosphorescent organic light-emitting diode stack 608, grid 610, anode 612, thin film transistor passivation layer 614, thin film transistors 616, and substrate 618. One skilled in the art will recognize that other similar designs exist for flexible displays or other flexible displays which do not impact the utility of the embodiments of the present invention. Curved rigid support structure 620 is shown which supports and defines the final curvature of the flexible display 602. Fabrication of the curved rigid support structure may be via sheet metal, molded polymeric materials, vacuum formed polymeric materials, thermoformed polymeric materials, or similar. An additional protective layer 622 is optional and may be made of formed glass, thin bendable glass or any other suitable material. Various attachment means may be employed to maintain the placement of the flexible display 602 relative to the rigid support structure 620. Such attachment means may include adhesives, mechanical fasteners, encapsulation between the rigid support structure 620 and the optional protective layer 622, encapsulation between the rigid support structure 620 and/or a bezel (not shown) or similar. As previously stated, FIG. 6 is a schematic representation and is not to scale. FIG. 7 illustrates a schematic partial cross-section view of a typical flexible display mounted on the rigid support structure of the embodiments of the present invention. As shown, the curved rigid support structure assembly 702 includes a support structure 708 which supports and assists in forming the flexible display 602. The support structure assembly, shown in broken line, is attached to a raised EGM display support cradle 704 which attaches to the EGM housing 706. Although a nut and bolt attachment 710 means is shown, any suitable attachment means may be utilized. As shown, the flexible display 602 extends to the edge of rigid support structure 708 and is attached via any convenient means such as adhesives and the like. In this embodiment, the rigid support structure 708 is formed from sheet metal using a press, vacuum forming, rolling, or any other suitable means to produce the desired curvature. The curved rigid support structure 702, including the flexible display, may include a touchscreen, if desired. As previously stated, FIG. 7 is a schematic representation and is not to scale.

Figure 8:
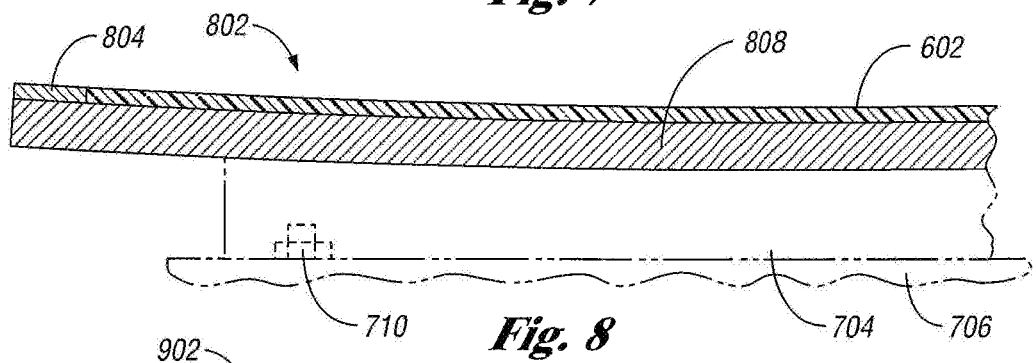
FIG. 8 illustrates a schematic partial cross-section view of a typical flexible display mounted on another embodiment of the rigid support structure of the present invention.

FIG. 8 illustrates a schematic partial cross-section view of another embodiment of a typical flexible display mounted on the rigid support structure of the present invention. As shown, the rigid support structure assembly 802 includes a support structure 808 which supports and assists in forming the flexible display 602. The support structure assembly is attached to a raised EGM display support cradle 704 which attaches to the EGM housing 706. Although a nut and bolt attachment 710 means is shown, any suitable attachment means may be utilized. As shown, the flexible display 602 does not extend to the edge of rigid support structure 808 in this embodiment. Instead, frame 804 is mounted to the rigid support structure 808 which captures the flexible display 602. As the frame 804 is preferably formed from sheet metal, it may be attached to the rigid support structure 808 via any convenient means such as adhesives, spot welding, etc. The flexible display 602 is placed inside of frame 804 and attached utilizing any convenient means such as adhesives or the like. In this embodiment, the curved rigid support structure 808 is formed from sheet metal using a press, vacuum forming, rolling, or any other suitable means to produce the desired curvature. The rigid support structure assembly 802, including the flexible display 602, may include a touchscreen, if desired. As previously stated, FIG. 8 is a schematic representation and is not to scale.

Figure 9:
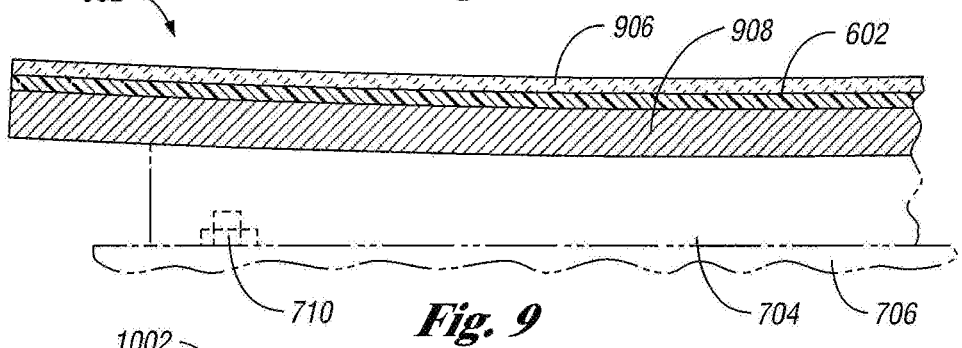
FIG. 9 illustrates a schematic partial cross-section view of a typical flexible display mounted on another embodiment of the rigid support structure of the present invention.

FIG. 9 illustrates a schematic partial cross-section view of a typical flexible display mounted on the rigid support structure of the present invention. As shown, the curved rigid support structure assembly 902 includes a support structure 908 which supports and assists in forming the flexible display 602. One skilled in the art will recognize that even though the embodiments described and illustrated herein, the rigid support structure may also be flat of relatively flat. The support structure assembly is attached to a raised EGM display support cradle 704 which attaches to the EGM housing 706. Although a nut and bolt attachment 710 means is shown, any suitable attachment means may be utilized. As shown, the flexible display 602 extends to the edge of rigid support structure 908 and is attached via any convenient means such as adhesives and the like. Transparent layer 906 may be applied to protect the flexible display 602 and/or add a touchscreen, if desired and may be constructed of formed glass, bendable glass or a transparent polymer material. In this embodiment, the rigid support structure 908 is formed from sheet metal using a press, vacuum forming, rolling, or any other suitable means to produce the desired curvature. One skilled in the art will recognize that embodiments shown as metal or plastic may often be interchangeable depending on the most practical production means. The rigid support structure assembly 902, including the flexible display, may include a touchscreen, if desired. As previously stated, FIG. 9 is a schematic representation and is not to scale.

Figure 10:
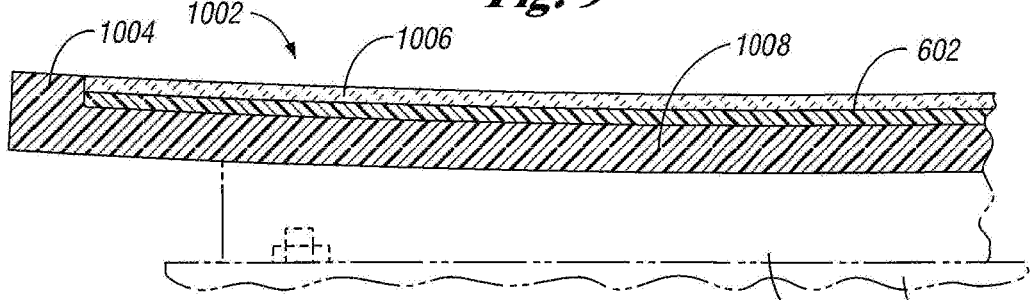
FIG. 10 illustrates a schematic partial cross-section view of a typical flexible display mounted on another embodiment of the rigid support structure of the present invention.

FIG. 10 illustrates a schematic partial cross-section view of another embodiment of a typical flexible display mounted on the rigid support structure of the present invention. As shown, the rigid support structure assembly 1002 includes a support structure 1008 which supports and assists in forming the flexible display 602. The support structure assembly is attached to a raised EGM display support cradle 704 which attaches to the EGM housing 706. Although a nut and bolt attachment 710 means is shown, any suitable attachment means may be utilized. As shown, the flexible display 602 does not extend to the edge of rigid support structure 1008 in this embodiment. Instead, a framing lip is provided and is either attached to or integral with the rigid support structure 1008 which captures the flexible display 602. The flexible display 602 is placed inside of framing lip 1004 and attached utilizing any convenient means such as mechanical fastening, mechanical encapsulation, adhesives, or the like. In this embodiment, the curved rigid support structure 1008 is formed from a polymer material using injection molding, vacuum forming, thermoforming, or any other suitable means to produce the desired curvature. Transparent layer 1006 may be applied to protect the flexible display 602, if desired, and may be constructed of formed glass, bendable glass or a transparent polymer material. If transparent layer is added, the height of the framing lip is approximately equal to the thickness of the flexible display 602 plus the thickness of the transparent layer 1006. If there is no transparent layer, the height of the framing lip 1004 is approximately the same as the thickness of the flexible display 602. The curved rigid support structure assembly 1002, including the flexible display, may include a touchscreen, if desired. As previously stated, FIG. 10 is a schematic representation and is not to scale.

Figure 11:
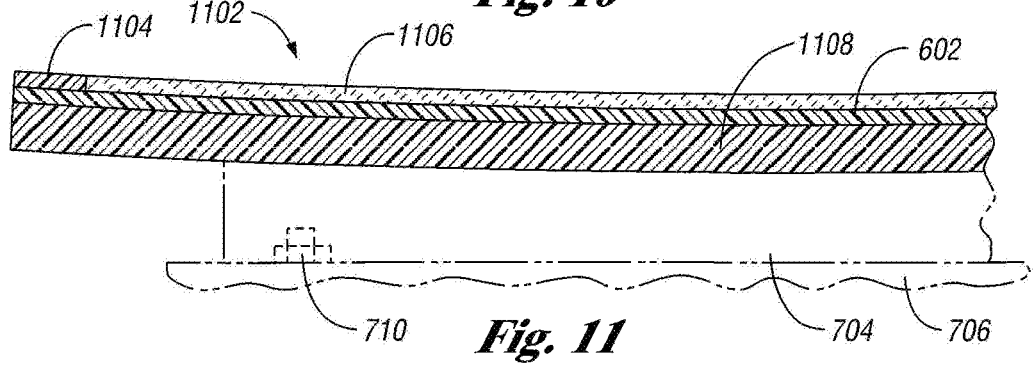
FIG. 11 illustrates a schematic partial cross-section view of a typical flexible display mounted on yet another embodiment of the rigid support structure of the present invention.

FIG. 11 illustrates a schematic partial cross-section view of yet another embodiment of a typical flexible display mounted on the rigid support structure of the present invention. As shown, the rigid support structure assembly 1102 includes a support structure 1108 which supports and assists in forming the flexible display 602. The support structure assembly is attached to a raised EGM display support cradle 704 which attaches to the EGM housing 706. Although a nut and bolt attachment 710 means is shown, any suitable attachment means may be utilized. As shown, the flexible display 602 extends to the edge of rigid support structure 1108 in this embodiment. Transparent layer 1006 may be applied to protect the flexible display 602, if desired and may be constructed of formed glass, bendable glass or a transparent polymer material. As shown, transparent protective layer 1006 does not extend to the edge of either the flexible display 602 or rigid support structure 1108 as it is housed within a bezel 1104 which surrounds the flexible display 602. The rigid support structure 1108 and the bezel 1104 may be constructed of sheet metal, plastic, or any other suitable materials and formed and attached as previously described. The rigid support structure assembly 1102, including the flexible display, may include a touchscreen, if desired. As previously stated, FIG. 11 is a schematic representation and is not to scale.

Although FIG. 7 to FIG. 11 show various embodiments including differing materials, construction methods, layers, etc., one skilled in the art will recognize that these are only an exemplification of the principles of the invention as well as the best mode of practicing same and is not intended to limit the broad aspects or scope of the invention or claims to the specific embodiments illustrated or described.

Figure 12C:
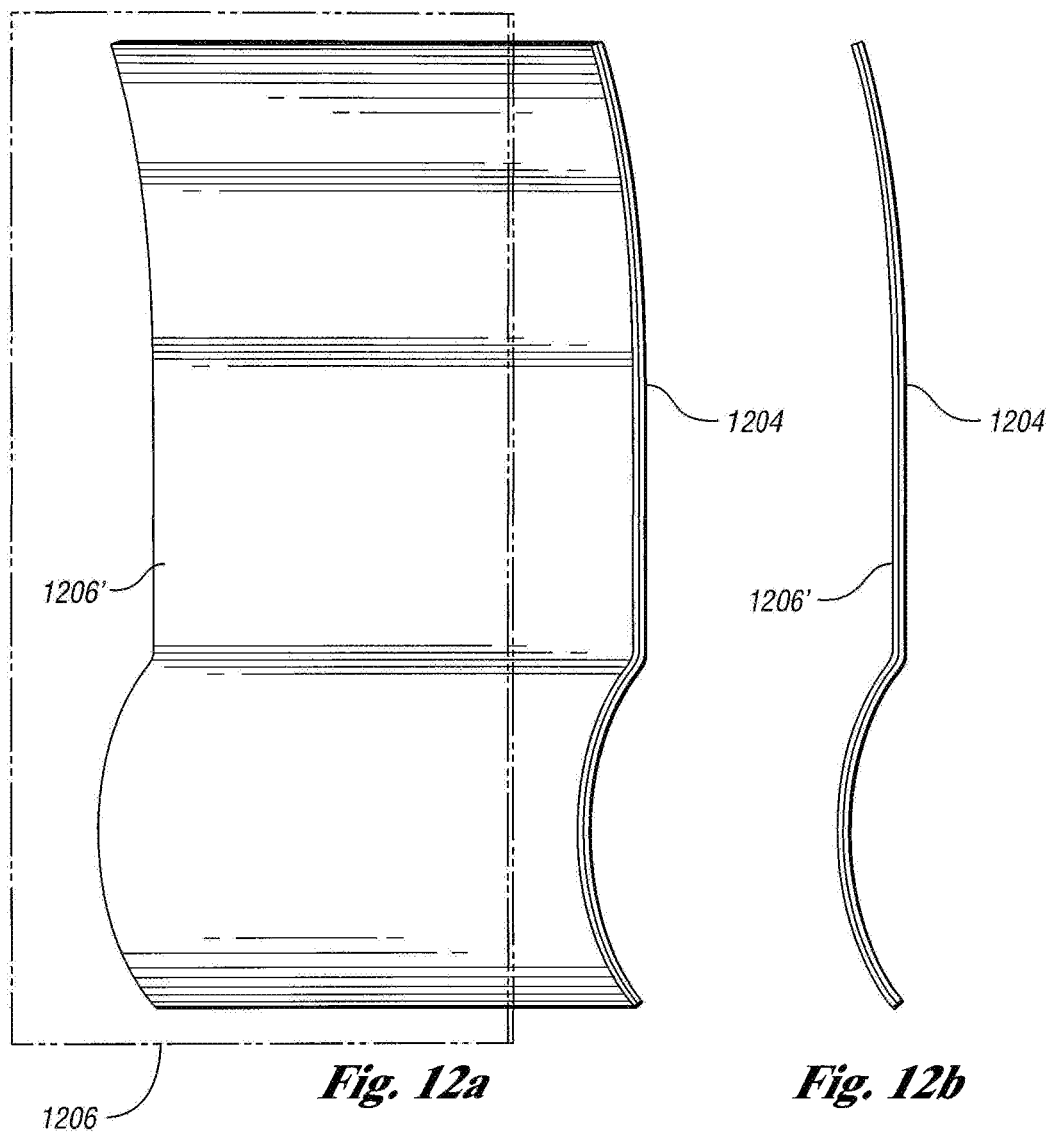
FIG. 12C illustrates a schematic partial cross-section view of an exemplar flexible display embodiment being formed and then attached to an exemplar rigid support of the present invention.
Figure 12C:
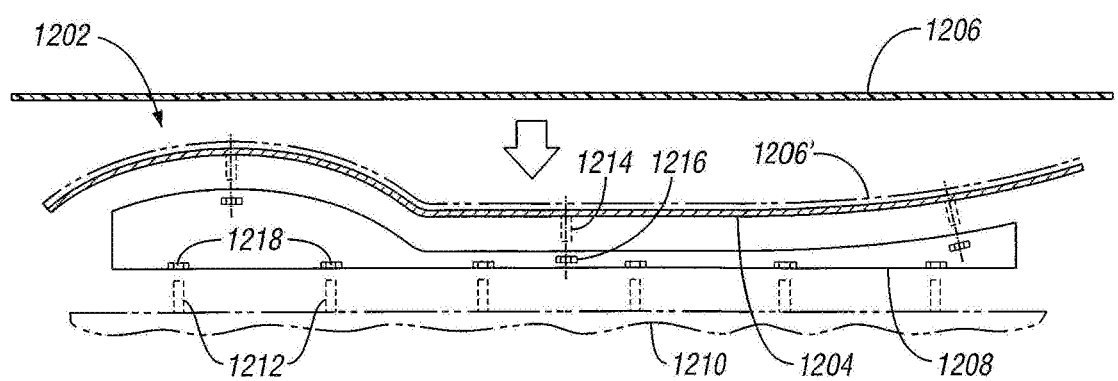

FIG. 12A illustrates an isometric view of an exemplar flexible display mounted to an exemplar rigid support structure of the embodiments of the present invention. As shown in the assembled and formed condition, flexible display screen 1206' is mounted to rigid support structure 1204 which assisted in the final forming of flexible display 1206. As schematically illustrated in FIG. 12A and FIG. 12C, the length of the flexible display 1206 before forming appears longer than the formed display 1206'. This is due to the forming operation as the original length of flexible display 1206 is approximately equal to the developed surface length, including the curvatures shown in flexible display 1206'. Once the flexible display 1206' is formed and fixed or attached to the rigid support structure 1204, it is no longer flexible as in its normal state. In this embodiment, the flexible display 1206 has been manipulated in both the y-axis and z-axis to produce the final desired shape, however one skilled in the art will recognize that manipulation to the final desired shape in not limited to the y-axis and z-axis as it may also be manipulated simultaneously in the x-axis, or any combination thereof, but in any case, the flexible display 1206 is not stretchable or compressible along any axis to any significant degree. While the embodiment shown in FIG. 12A corresponds to the top flexible display layer of schematic illustration of FIG. 7, one skilled in the art will recognize that any of the assembly components or methods shown in FIGS. 7 through 11 or similar may be utilized along with other methods not shown but contemplated by the embodiments of the present invention.

FIG. 12B illustrates a side view of the exemplar flexible display 1206' mounted to a rigid support structure 1204 of the embodiments of the present invention. As illustrated, once the flexible display is attached to the rigid support structure 1204, the flexible display 1206' is no longer flexible without undue force applied which does not occur in use on a gaming floor. Attachment of the flexible display 1206' can be achieved by any convenient means such as adhesives or the like. While the embodiment shown in FIG. 12B corresponds to the top flexible display layer of schematic illustration of FIG. 7, one skilled in the art will recognize that any of the assembly methods shown in FIGS. 7 through 11 or similar may be utilized along with other methods not shown but contemplated by the embodiments of the present invention. After assembly, as illustrated in FIG. 12B, any of the edge assemblies illustrated in FIGS. 16A through 16E or similar may be utilized to complete the assembly. Those skilled in the art will recognize that other edge embodiments may be utilized in addition to those illustrated and are contemplated by the present invention. Such assembly may be performed either before attachment to the EGM display support cradle 1208 or anytime thereafter.

FIG. 12C illustrates a schematic partial cross-section view of the exemplar flexible display 1206' being formed and then fixed or attached to a rigid support 1204 of the embodiments of the present invention and further attached to an EGM display support cradle 1208 which is further attached to the EGM housing 1210. Flexible display 1206 is shown in flat state but one skilled in the art will recognize that the flexible display is quite pliable as is only shown as flat for illustration purposes. Moreover, the flexible display 1206 may be preformed to an extent to assist in final shaping. During the assembly process, the flexible display 1206 are formed in the same shape as the rigid support structure 1204 and adhered by any conventional means or be captured by an additional transparent layer or bezel type assembly as illustrated in FIG. 7 through FIG. 11. Once attached to the rigid support structure 1204, the flexible display 1206' is no longer flexible and is in its final operational form. As previously described, the rigid support structure 1204 may be manufactured by sheet metal or plastic and after the flexible display 1206' is attached, the assembly 1202 is attached to the EGM display support cradle 1208. Attachment may be by any suitable means such as threaded stud 1214 projecting from the rigid support structure 1204 passing through a hole in the EGM display support cradle 1208, which is hollow and then retained by threaded nuts 1216 attached from the underside. Those skilled in the art will recognize that any suitable attachment means may be utilized, such as fasteners, adhesives, or the like. After assembly 1202 is attached to the EGM display support cradle 1208, it is then attached to the EGM housing 1210. Attachment may be by any suitable means such as threaded studs 1212 projecting from the EGM housing 1210 passing through a hole in the EGM display support cradle 1208 and attached using threaded nuts 1218. Those skilled in the art will recognize that any suitable attachment means may be utilized to attach EGM display support cradle 1208 to the EGM housing 1210, such as fasteners, adhesives, or the like. Although the upper surface of the EGM housing 1210 is shown as flat, along with the bottom surface of EGM display support cradle 1208, it may be advantageous to shape it in other ways for utility of cosmetic reasons, such as curved. One skilled in the art will recognize that the assembly steps described can be in any convenient order and although the various components are illustrated as being in a flat or horizontal state, assembly may also be accomplished at any angle such as vertical or any combination thereof such as attaching the flexible display 1206 to the rigid support cradle 1204 in a generally horizontal plane, and then attaching the EGM display support cradle, also in a generally horizontal plane and rotating the partially complete assembly to a generally vertical position and attaching to the EGM housing 1210 which is normally in a generally vertical state.

Figure 13C:
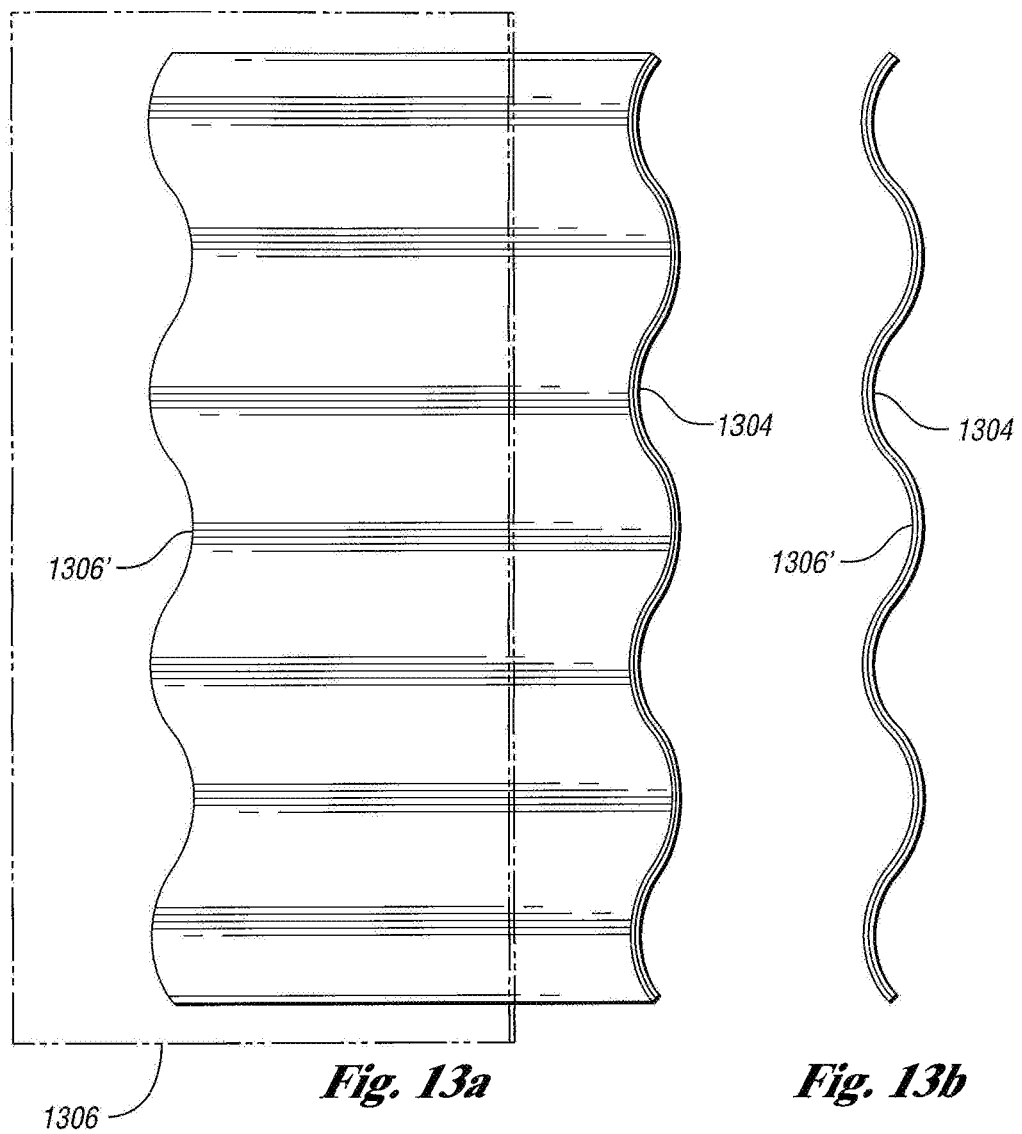
FIG. 13C illustrates a schematic partial cross-section view of another exemplar flexible display embodiment being formed and then attached to an exemplar rigid support of the present invention.
Figure 13C:
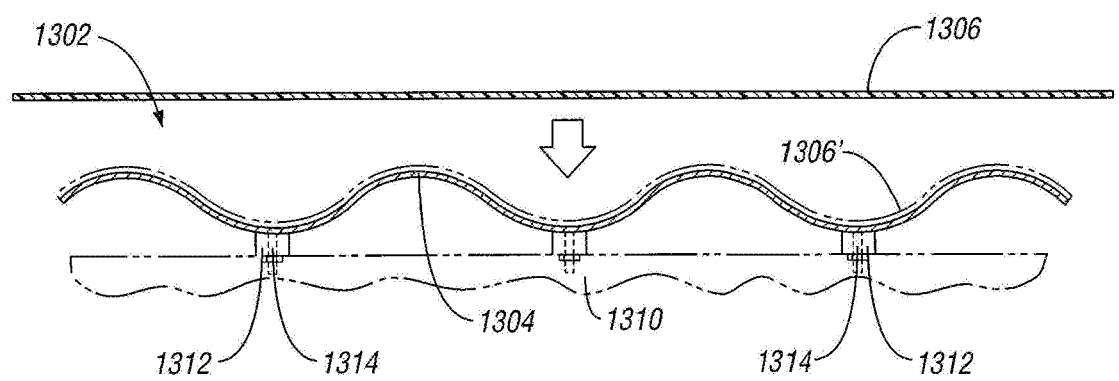

FIG. 13A illustrates an isometric view of an exemplar flexible display embodiment mounted to a rigid support structure of the present invention. As shown in the assembled and formed condition, which in this case is a generally serpentine shape, flexible display screen 1306' is mounted to rigid support structure 1304 which assisted in the final forming of flexible display 1306. As schematically illustrated in FIG. 13A and FIG. 13C, the length of the flexible display 1306 before forming appears longer than the formed display 1306'. This is due to the forming operation as the original length of flexible display 1306 is approximately equal to the developed surface length, including the curvatures shown in flexible display 1306'. Once the flexible display 1306' is formed and fixed to the rigid support structure 1304, it is no longer be flexible as in its normal state. In this embodiment, the flexible display 1306' has been manipulated in both the y-axis and z-axis to produce the final desired shape, however one skilled in the art will recognize that manipulation to the final desired shape in not limited to just the y-axis and z-axis as it may also be manipulated simultaneously in the x-axis, or any combination thereof, but in any case, the flexible display 1306 is not be stretchable or compressible along any axis to any significant degree. While the embodiment shown in FIG. 13A corresponds to the top flexible display layer of schematic illustration of FIG. 7, one skilled in the art will recognize that any of the assembly components or methods shown in FIGS. 7 through 11 or similar may be utilized along with other methods not shown but contemplated by the embodiments of the present invention.

FIG. 13B illustrates a side view of the exemplar flexible display 1306' mounted to a rigid support structure 1304 of the embodiments of the present invention. As illustrated, once the flexible display is attached to the rigid support structure 1304, the flexible display 1306' is no longer flexible without undue force applied which does not occur in use on a gaming floor. Attachment of the flexible display 1306' can be achieved by any convenient means such as adhesives, fasteners, or the like. While the embodiment shown in FIG. 13B corresponds to the top flexible display layer of schematic illustration of FIG. 7, one skilled in the art will recognize that any of the assembly methods shown in FIGS. 7 through 11 or similar may be utilized along with other methods not shown but contemplated by the embodiments of the present invention. After assembly, as illustrated in FIG. 13B, any of the edge assemblies illustrated in FIGS. 16A through 16E or similar may be utilized to complete the assembly. Those skilled in the art will recognize that other edge embodiments may be utilized in addition to those illustrated and are contemplated by the present invention. Such assembly may be performed either before attachment to the EGM display support cradle 1308 or anytime thereafter.

FIG. 13C illustrates a schematic partial cross-section view of the exemplar flexible display embodiment being formed and then attached to an exemplar rigid support 1304 of the present invention and further attached to display supports 1312 and 1314 which are attached to the EGM housing 1310. Those skilled in the art will recognize that the number of display supports may vary depending on the number of supports utilized to support rigid support 1304. Flexible display 1306 is shown in flat state but one skilled in the art will recognize that the flexible display is quite pliable as is only shown as flat for illustration purposes. Moreover, the flexible display 1306 may be pre-formed to any extent to assist in final shaping. As schematically illustrated, the length of the flexible display 1306 before forming appears longer than the formed display 1306'. This is due to the forming operation as the original length of flexible display 1306 is approximately equal to the developed surface length, including the curvatures shown. The lengths are approximately equal as some distortion of the developed surface length may occur in forming process. During the assembly process, the flexible display 1306 is formed in the same shape as the rigid support structure 1304 and adhered by any conventional means or be captured by an additional transparent layer or bezel type assembly as illustrated in FIG. 7 through FIG. 11. Once attached to the rigid support structure 1304, the flexible display 1306' is no longer flexible and is in its final operational form. As previously described, the rigid support structure 1304 may be manufactured by sheet metal or a polymer material and after the flexible display 1306' is attached, the assembly 1302 is attached to the display supports 1312 and 1314. Attachment may be by any suitable means such as threaded stud 1314 projecting from the rigid support structure 1304 passing through a number of display supports between the rigid support structure 1304 and the EGM housing 1310, which is hollow and then retained by threaded nuts 1314 attached from the underside. Those skilled in the art will recognize that any suitable attachment means may be utilized, such as fasteners, adhesives, or the like. After assembly 1302 is attached to the EGM display supports, it is then attached to the EGM housing 1310. Although the upper surface of the EGM housing 1310 is shown as flat, along with the bottom surface of the display supports 1312 and 1314, it may be advantageous to shape it in other ways for utility of cosmetic reasons, such as curved. One skilled in the art will recognize that the assembly steps described can be in any convenient order and although the various components are illustrated as being in a flat or horizontal state, assembly may also be accomplished at any angle such as vertical or any combination thereof such as attaching the flexible display 1306 to the rigid support cradle 1304 in a generally horizontal plane, and then attaching the EGM display support cradle, also in a generally horizontal plane and rotating the partially complete assembly to a generally vertical position and attaching to the EGM housing 1310 which is normally in a generally vertical state. Those skilled in the art will recognize that the term "generally vertical state" of any embodiment shown or contemplated by the present invention may vary greatly and fall within a wide range of plus 40° to a negative 40° relative to true vertical, as an example, depending on the final EGM design.

Figure 14C:
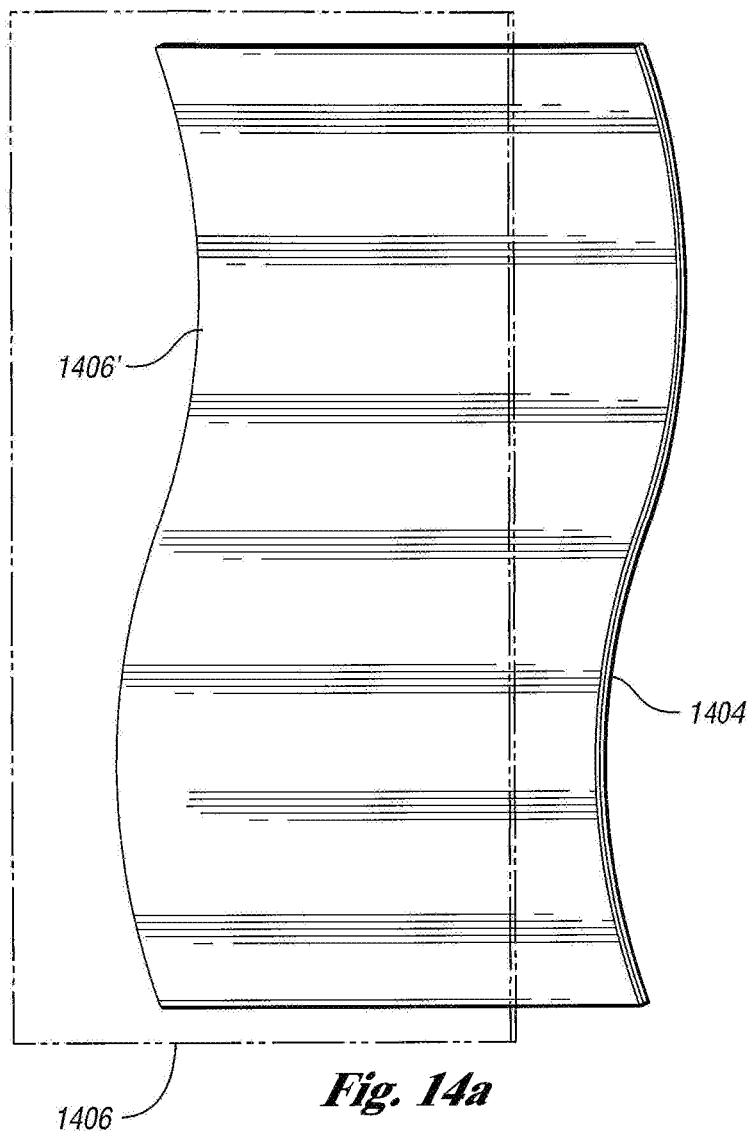
FIG. 14C illustrates a schematic partial cross-section view of yet another exemplar flexible display embodiment being formed and then attached to an exemplar rigid support of the present invention.
Figure 14C:
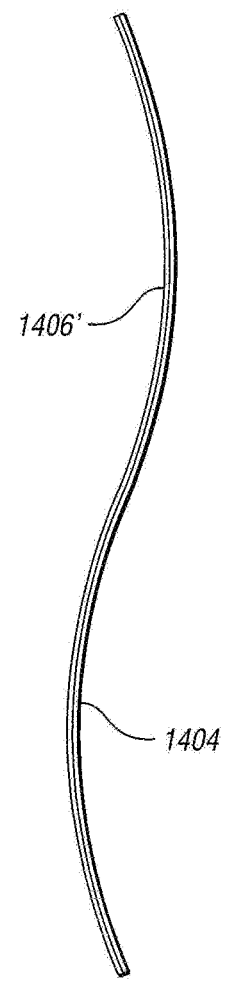
Figure 14C:
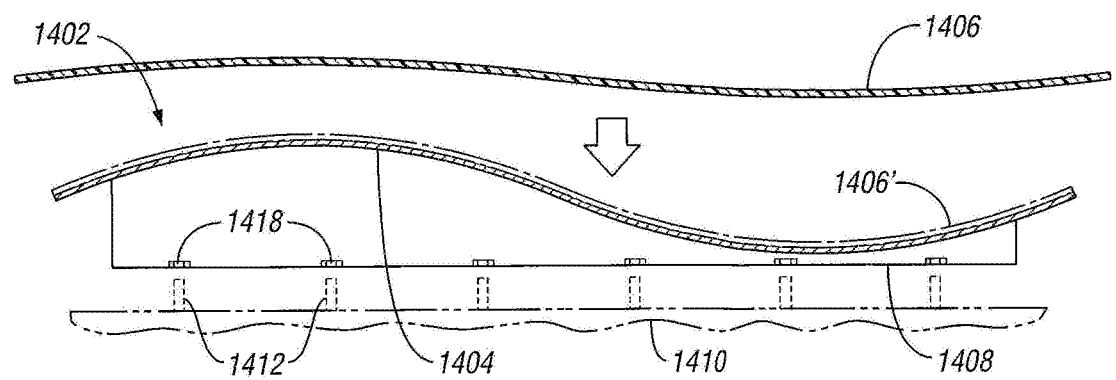

FIG. 14A illustrates an isometric view of an exemplar flexible display embodiment mounted to an exemplar curved rigid support structure of the present invention. As shown in the assembled and formed condition, which in this case is a generally serpentine shape, flexible display screen 1406' is mounted to rigid support structure 1404 which assisted in the final forming of flexible display 1406. As schematically illustrated in FIG. 14A and FIG. 14C, the length of the flexible display 1406 before forming appears longer than the formed display 1406'. This is due to the forming operation as the original length of flexible display 1406 is approximately equal to the developed surface length, including the curvatures shown in flexible display 1406'. Once the flexible display 1406' is formed and fixed to the rigid support structure 1404, it is no longer flexible as in its normal state.

In this embodiment, the flexible display 1406' has been manipulated in both the y-axis and z-axis to produce the final desired shape, however one skilled in the art will recognize that manipulation to the final desired shape is not limited to just the y-axis and z-axis as it may also be manipulated simultaneously in the x-axis, or any combination thereof, but in any case, the flexible display 1406 is not stretchable or compressible along any axis to any significant degree. While the embodiment shown in FIG. 14A corresponds to the top flexible display layer of schematic illustration of FIG. 7, one skilled in the art will recognize that any of the assembly components or methods shown in FIGS. 7 through 11 or similar may be utilized along with other methods not shown but contemplated by the embodiments of the present invention.

FIG. 14B illustrates a side view of the exemplar flexible display 1406' mounted to a curved rigid support structure 1404 of the embodiments of the present invention. As illustrated, once the flexible display is attached to the curved rigid support structure 1404, the flexible display 1406' is no longer flexible without undue force applied which does not occur in normal use on a gaming floor. Attachment of the flexible display 1406' can be achieved by any convenient means such as adhesives, fasteners, or the like. While the embodiment shown in FIG. 14B corresponds to the top flexible display layer of schematic illustration of FIG. 7, one skilled in the art will recognize that any of the assembly methods shown in FIGS. 7 through 11 or similar may be utilized along with other methods not shown but contemplated by the embodiments of the present invention. After assembly, as illustrated in FIG. 14B, any of the edge assemblies illustrated in FIGS. 16A through 16E or similar may be utilized to complete the assembly. Those skilled in the art will recognize that other edge embodiments may be utilized in addition to those illustrated and are contemplated by the present invention. Such assembly may be performed either before attachment to the EGM display support cradle 1408 or anytime thereafter.

FIG. 14C illustrates a schematic partial cross-section view of the exemplar flexible display embodiment being formed and then attached to an exemplar rigid support 1404 of the present invention and further attached to an EGM display support cradle 1408 which is further attached to the EGM housing 1410. Flexible display 1406 is shown slightly preformed to a serpentine shape but one skilled in the art will recognize that the flexible display is quite pliable as is shown in a preformed shape for illustration purposes. Moreover, the flexible display 1406 may be pre-formed to any desired extent to assist in final shaping such as less than that illustrated to approximating final shape. During the assembly process, the flexible display 1406 is formed in the similar shape as the curved rigid support structure 1404 and adhered by any conventional means or be captured but an additional transparent layer or bezel type assembly as illustrated in FIG. 7 through FIG. 11. Once attached to the rigid support structure 1404, the flexible display 1406' is no longer flexible and is in its final operational form. As previously described, the rigid support structure 1404 may be manufactured by sheet metal, a polymer material, or similar and after the flexible display 1406' is attached, the assembly 1402 is attached to the EGM display support cradle 1408. Attachment may be by any suitable means such as threaded stud 1412 projecting from the rigid support structure 1404 passing through a hole in the EGM display support cradle 1408, which is hollow and then retained by threaded nuts 1418 attached from the underside. Those skilled in the art will recognize that any suitable attachment means may be utilized, such as fasteners, adhesives, or the like. After assembly 1402 is attached to the EGM display support cradle 1408, it is then attached to the EGM housing 1410. One skilled in the art will recognize that assembly 1402 may be mounted directly to EGM housing 1410, if desired. Although the upper surface of the EGM housing 1410 is shown as flat, along with the bottom surface of EGM display support cradle 1408, it may be advantageous to shape it in other ways for utility of cosmetic reasons, such as curved. One skilled in the art will recognize that the assembly steps described can be in any convenient order and although the various components are illustrated as being in a flat or horizontal state, assembly may also be accomplished at any angle such as vertical or any combination thereof such as attaching the flexible display 1406 to the rigid support cradle 1404 in a generally horizontal plane, and then attaching the EGM display support cradle, also in a generally horizontal plane and rotating the partially complete assembly to a generally vertical position and attaching to the EGM housing 1410 which is normally in a generally vertical state.

Figure 15C:
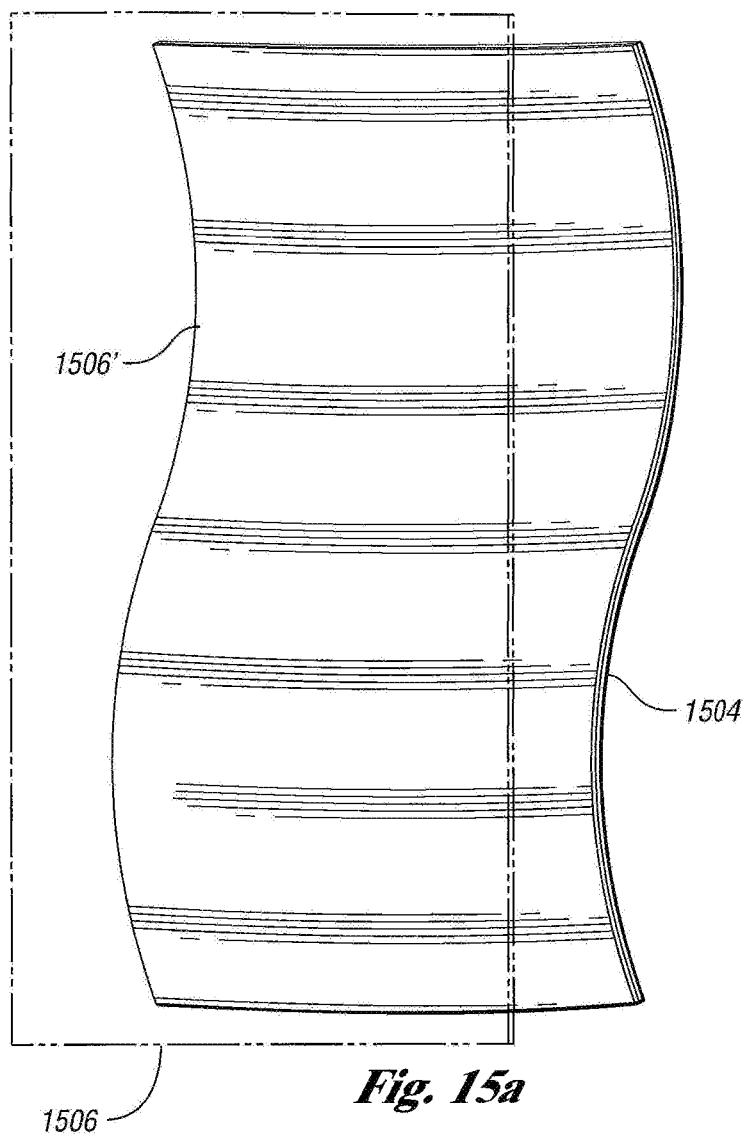
FIG. 15C illustrates a schematic partial cross-section view of another exemplar flexible display embodiment being formed and then attached to an exemplar rigid support of the present invention.
Figure 15C:
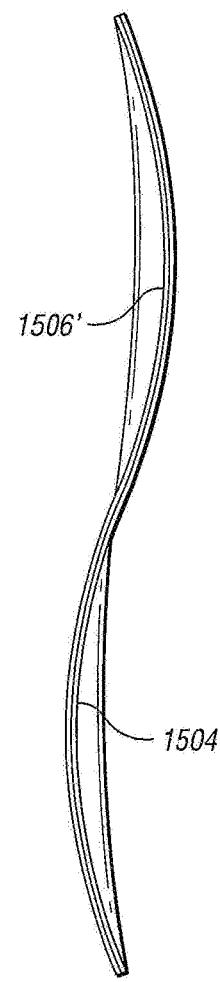
Figure 15C:
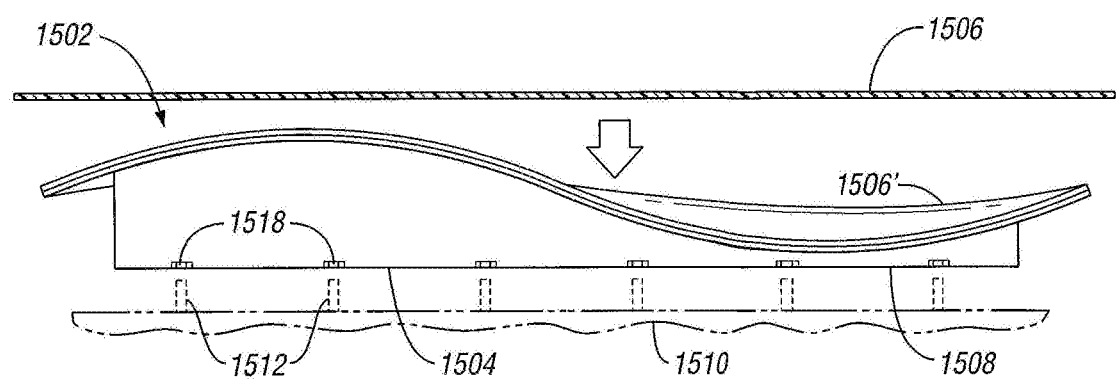

FIG. 15A illustrates an isometric view of an exemplar flexible display embodiment mounted to an exemplar curved rigid support structure of the present invention. As shown in the assembled and formed condition, which in this case is a generally serpentine shape, flexible display screen 1506' is mounted to rigid support structure 1504 which assisted in the final forming of flexible display 1506. As schematically illustrated in FIG. 15A and FIG. 15C, the length of the flexible display 1506 before forming appears longer than the formed display 1506'. This is due to the forming operation as the original length of flexible display 1506 is approximately equal to the developed surface length, including the curvatures shown in flexible display 1506'. Once the flexible display 1506' is formed and fixed to the rigid support structure 1504, it is no longer flexible as in its normal state. In this embodiment, the flexible display 1506' has been manipulated in the y-axis, x-axis and z-axis to produce the final desired shape. One skilled in the art will recognize that manipulation to the final desired shape in not limited any particular axis as it may also be manipulated simultaneously in any combination of axes but in any case, the flexible display 1506 will not be stretchable or compressible along any axis to any significant degree. While the embodiment shown in FIG. 15A corresponds to the top flexible display layer of schematic illustration of FIG. 7, one skilled in the art will recognize that any of the assembly components or methods shown in FIGS. 7 through 11 or similar may be utilized along with other methods not shown but contemplated by the embodiments of the present invention.

FIG. 15B illustrates a side view of the exemplar flexible display 1506' mounted to a rigid support structure 1504 of the embodiments of the present invention. As illustrated, once the flexible display is attached to the rigid support structure 1504, the flexible display 1506' is no longer flexible without undue force applied which does not occur in use on a gaming floor. Attachment of the flexible display 1506' can be achieved by any convenient means such as adhesives, fasteners, or the like. While the embodiment shown in FIG. 15B corresponds to the top flexible display layer of schematic illustration of FIG. 7, one skilled in the art will recognize that any of the assembly methods shown in FIGS. 7 through 11 or similar may be utilized along with other methods not shown but contemplated by the embodiments of the present invention. After assembly, as illustrated in FIG. 15B, any of the edge assemblies illustrated in FIGS. 16A through 16E or similar may be utilized to complete the assembly. Those skilled in the art will recognize that other edge embodiments may be utilized in addition to those illustrated and are contemplated in the present invention. Such assembly may be performed either before attachment to the EGM display support cradle 1508 or anytime thereafter.

FIG. 15C illustrates a schematic partial cross-section view of the exemplar flexible display embodiment being formed and then attached to an exemplar rigid support 1504 of the present invention and further attached to an EGM display support cradle 1508 which is further attached to the EGM housing 1510. Flexible display 1506 is shown slightly pre-formed to a serpentine shape but one skilled in the art will recognize that the flexible display is quite pliable as is shown in a pre-formed shape for illustration purposes. Moreover, the flexible display 1506 may be pre-formed to any desired extent to assist in final shaping such as less than that illustrated to the approximate final shape. During the assembly process, the flexible display 1506 will be formed in the same shape as the rigid support structure 1504 and adhered by any conventional means or be captured but an additional transparent layer or bezel type assembly as illustrated in FIG. 7 through FIG. 11. Once attached to the rigid support structure 1504, the flexible display 1506' is no longer flexible and is in its semifinal or final operational form. As previously described, the rigid support structure 1504 may be manufactured by sheet metal, a polymer material, or similar and after the flexible display 1506' is attached, the assembly 1502 will be attached to the EGM display support cradle 1508. Attachment may be by any suitable means such as threaded stud 1512 projecting from the rigid support structure 1504 passing through a hole in the EGM display support cradle 1508, which is hollow and then retained by threaded nuts 1518 attached from the underside. Those skilled in the art will recognize that any suitable attachment means may be utilized, such as fasteners, adhesives, or the like. After assembly 1502 is attached to the EGM display support cradle 1508, it is then attached to the EGM housing 1510. One skilled in the art will recognize that assembly 1502 may be mounted directly to EGM housing 1510, if desired. Although the upper surface of the EGM housing 1510 is shown as flat, along with the bottom surface of EGM display support cradle 1508, it may be advantageous to shape it in other ways for utility of cosmetic reasons, such as curved. One skilled in the art will recognize that the assembly steps described can be in any convenient order and although the various components are illustrated as being in a flat or horizontal state, assembly may also be accomplished at any angle such as vertical or any combination thereof such as attaching the flexible display 1506 to the rigid support cradle 1504 in a generally horizontal plane, and then attaching the EGM display support cradle, also in a generally horizontal plane and rotating the partially complete assembly to a generally vertical position and attaching to the EGM housing 1510 which is normally in a generally vertical state.

Those skilled in the at will recognize that any of the embodiments, features, assemblies, fastening methods, etc., illustrated in FIGS. 12A through 15C and FIGS. 18A through 19C, may be utilized in other embodiments shown and others contemplated but not illustrated herein.

Figure 16A:
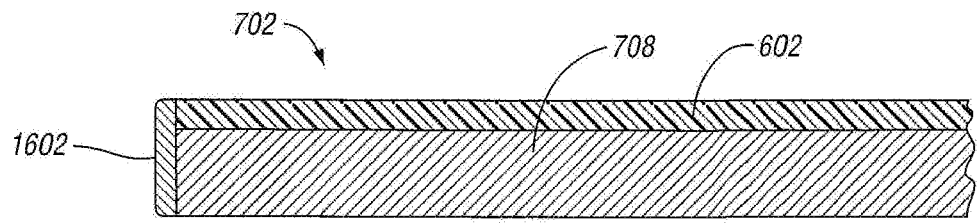
FIG. 16A illustrates a schematic partial cross-section view of a rigid support structure with a mounted flexible display including a metallic edge covering strip.

FIG. 16A illustrates a schematic partial cross-section view of a rigid support structure with a mounted flexible display including a metallic edge covering strip. As shown, the flexible display 602 is mounted on the rigid support structure 708 of the embodiments of the present invention to form a rigid flexible display and support assembly 702. For simplicity purposes, the assembly is shown in a relatively flat condition but one skilled in the art will recognize that only a very small segment is shown in the cross-section view and any number of curved configurations are represented by this figure. After the rigid flexible display and support assembly 702 is completed, it may often be desirous to add an edge covering strip 1602 around the perimeter or any portion thereof. Generally, the edge covering strip 1602 serves two principal functions. First, to protect the rigid flexible display and support assembly 702 and second to add cosmetic or lighting effects to the EGM. In this embodiment, the edge covering strip 1602 is metallic and may be plated for cosmetic and protective reasons. Such plating may include any number of plating options such as bright chrome, black chrome, hard chrome, black oxide, or similar. Attachment of the edge covering strip 1602 to the rigid flexible display and support assembly 702 may be made by any convenient means such as mechanical fastening, adhesives, and the like.

Figure 16B:
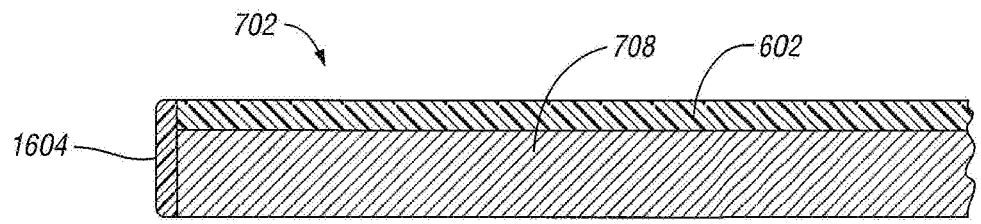
FIG. 16B illustrates a schematic partial cross-section view of a rigid support structure with a mounted flexible display including a polymer based edge covering strip.

FIG. 16B illustrates a schematic partial cross-section view of another rigid support structure with a mounted flexible display including a polymer material edge covering strip. As shown, the flexible display 602 is mounted on the rigid support structure 708 of the embodiments of the present invention to form a rigid flexible display and support assembly 702. For simplicity purposes, the assembly is shown in a relatively flat condition but one skilled in the art will recognize that only a very small segment is shown in the cross-section view and any number of curved configurations are represented by this figure. After the rigid flexible display and support assembly 702 is completed, it may often be desirous to add an edge covering strip 1604 around the perimeter or any portion thereof. Generally, the edge covering strip 1604 serves two principal functions. First, to protect the rigid flexible display and support assembly 702 and second to add cosmetic or lighting effects to the EGM. In this particular embodiment, the edge covering strip 1604 is formed from a polymer material and may be plated for cosmetic and protective reasons. Such plating may include any number of plating options such as bright chrome, black chrome, hard chrome, black oxide, or similar. Attachment of the edge covering strip 1604 to the rigid flexible display and support assembly 702 may be made by any convenient means such as mechanical fastening, adhesives, and the like.

Figure 16C:
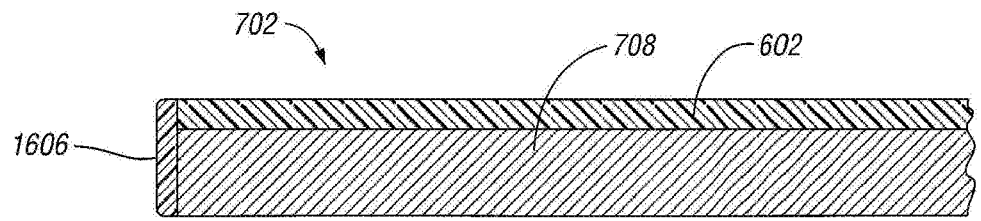
FIG. 16C illustrates a schematic partial cross-section view of a rigid support structure with a mounted flexible display including an electroluminescent panel edge covering strip.

FIG. 16C illustrates a schematic partial cross-section view of a rigid support structure with a mounted flexible display including a electroluminescent panel edge covering strip. As shown, the flexible display 602 is mounted on the rigid support structure 708 of embodiments of the present invention to form a rigid flexible display and support assembly 702. For simplicity purposes, the assembly is shown in a relatively flat condition but one skilled in the art will recognize that only a very small segment is shown in the cross-section view and any number of curved configurations are represented by this figure. After the rigid flexible display and support assembly 702 is completed, it may often be desirous to add an edge covering strip 1606 around the perimeter or any portion thereof. Generally, the electroluminescent panel edge covering strip 1606 serves two principal functions. First, to protect the rigid flexible display and support assembly 702 and second to add lighting effects to the EGM. In this particular embodiment, the edge covering strip 1606 is formed from a electroluminescent panel material and when energized, illuminates the perimeter of the rigid flexible display and support assembly 702 or any desired portion thereof. Attachment of the edge electroluminescent panel edge covering strip 1606 to the rigid flexible display and support assembly 702 may be made by any convenient means such as mechanical fastening, adhesives, and the like.

Figure 16D:
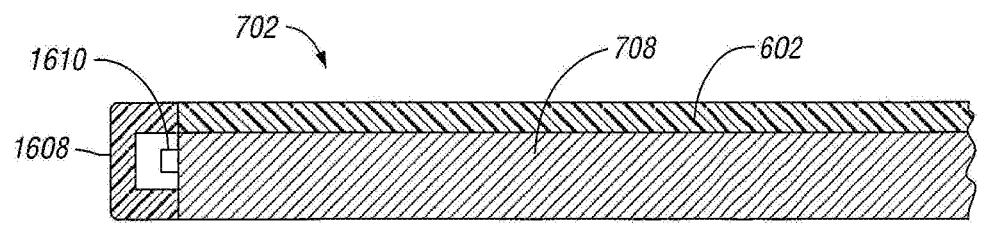
FIG. 16D illustrates a schematic partial cross-section view of a rigid support structure with a mounted flexible display including a LED lighting assembly edge covering strip.

FIG. 16D illustrates a schematic partial cross-section view of a rigid support structure with a mounted flexible display including an edge covering strip. As shown, the flexible display 602 is mounted on the rigid support structure 708 of the embodiments of the present invention to form a rigid flexible display and support assembly 702. For simplicity purposes, the assembly is shown in a relatively flat condition but one skilled in the art will recognize that only a very small segment is shown in the cross-section view and any number of curved configurations are represented by this figure. After the rigid flexible display and support assembly 702 is completed, it may often be desirous to add an edge covering strip 1608 around the perimeter or any portion thereof. Generally, the edge covering strip 1608 serves two principal functions. First, to protect the rigid flexible display and support assembly 702 and second to add lighting effects to the EGM. In this particular embodiment, the edge covering strip 1608 is formed from a translucent material which surround an LED strip 1610 and when the LED strip is energized, illuminates the perimeter of the rigid flexible display and support assembly 702 or any desired portion thereof. Any desired lighting effect may be achieved depending on the type of LED strip utilized and may be controlled by a controller (not shown). Attachment of the edge covering strip 1608 and LED strip 1610 to the rigid flexible display and support assembly 702 may be made by any convenient means such as mechanical fastening, adhesives, and the like.

Figure 16E:
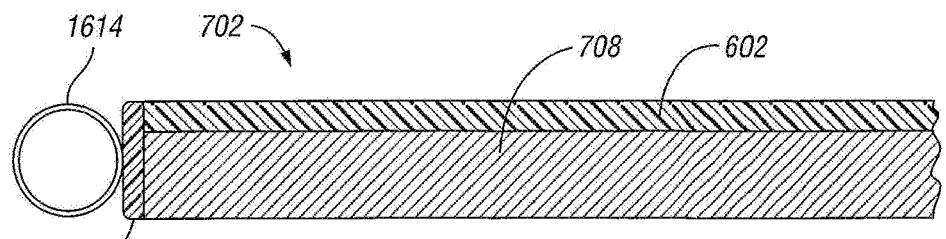
FIG. 16E illustrates a schematic partial cross-section view of a rigid support structure with a mounted flexible display including an edge covering strip including a neon light.

FIG. 16E illustrates a schematic partial cross-section view of a rigid support structure with a mounted flexible display including an edge covering strip. As shown, the flexible display 602 is mounted on the rigid support structure 708 of the embodiments of the present invention to form a rigid flexible display and support assembly 702. For simplicity purposes, the assembly is shown in a relatively flat condition but one skilled in the art will recognize that only a very small segment is shown in the cross-section view and any number of curved configurations are represented by this figure. After the rigid flexible display and support assembly 702 is completed, it may often be desirous to add an edge covering strip 1612 around the perimeter or any portion thereof. Generally, the edge covering strip 1612 serves two principal functions. First, to protect the rigid flexible display and support assembly 702 and second to add lighting effects to the EGM. In this particular embodiment, the edge covering strip 1612 is formed from either a metallic or a polymer material and once formed, neon lighting element 1614 is subsequently attached which will illuminate the perimeter of the rigid flexible display and support assembly 702 or any desired portion thereof. Attachment of the edge covering strip 1612 and neon lighting element 1614 to the rigid flexible display and support assembly 702 may be made by any convenient means such as mechanical fastening, adhesives, and the like.

Figure 17A:
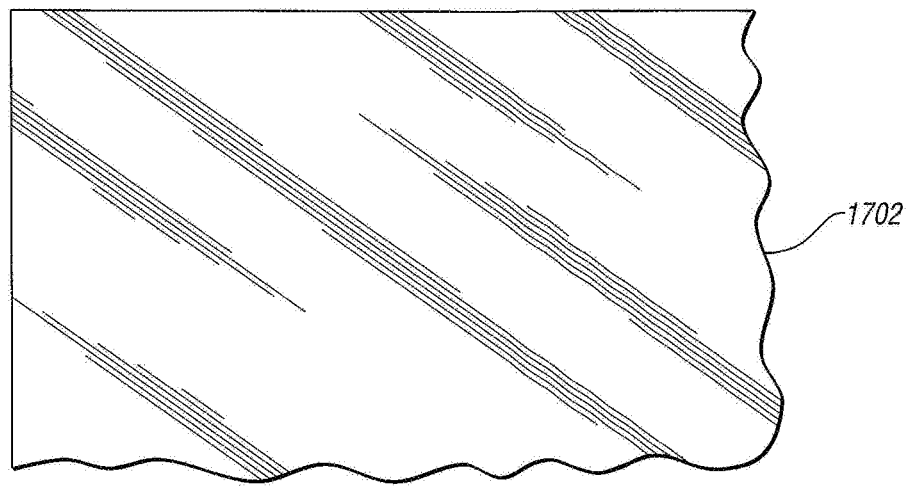
FIG. 17A illustrates a partial top plan view of the rigid support structure of the present invention.

FIG. 17A illustrates a partial top plan view of a rigid support structure 1702 according to the embodiments of the present invention. As illustrated, the rigid support structure 1702 may be constructed as seamless sheet of any suitable structural material such as sheet metal. The sheet metal may be formed utilizing any number of well-known forming means such as rolling, using a hydraulic press or similar. Alternatively, the rigid support structure 1702 may be constructed of a polymer material and formed via injection molding, vacuum forming, thermoforming, etc.

Figure 17B:
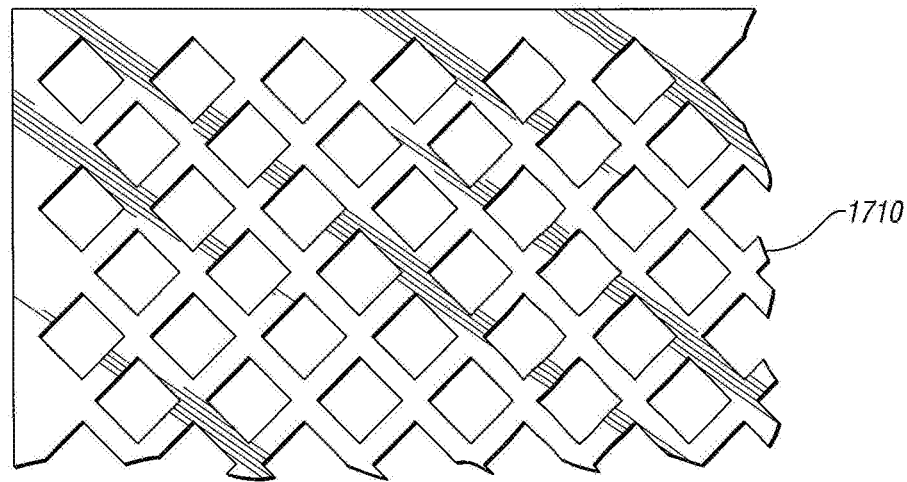
FIG. 17B illustrates a partial top plan view of another embodiment of the rigid support structure of the present invention.

FIG. 17B illustrates a partial top plan view of an alternative embodiment of the rigid support structure 1710 of the present invention. As illustrated, the rigid support structure 1710 may be constructed as perforated sheet of any suitable structural material such as sheet metal. The perforated sheet metal may be formed utilizing any number of well-known forming means such as rolling, using a press or similar and due to the perforations and will have a lighter weight than a solid sheet yet have suitable structural integrity to support and form the flexible display. Alternatively, the perforated rigid support structure 1710 may be constructed of a polymer material and formed via injection molding, vacuum forming, thermoforming, etc.

Figure 17C:
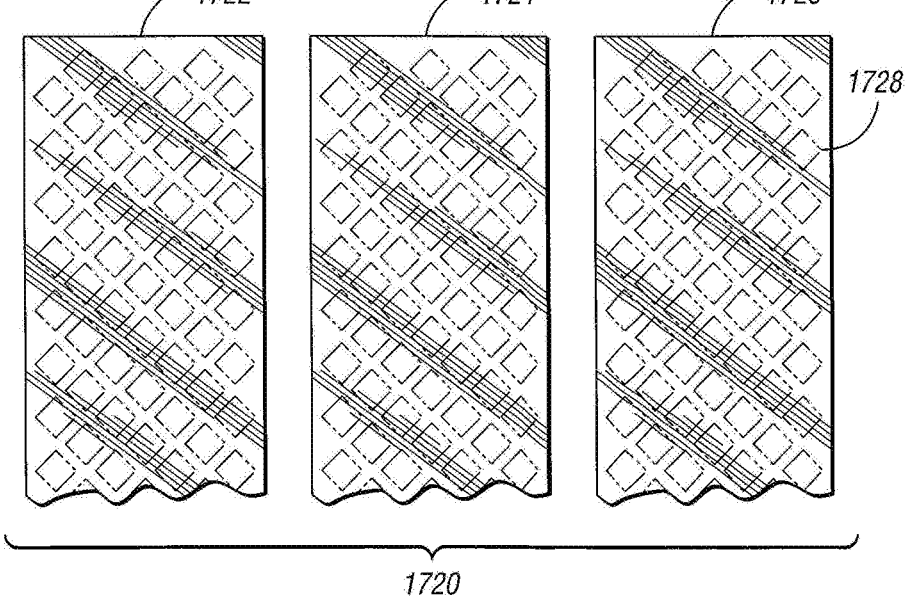
FIG. 17C illustrates a partial top plan view of yet another embodiment of the rigid support structure of the present invention.

FIG. 17C illustrates a partial top plan view of yet another embodiment of the rigid support structure 1720 of the present invention. As illustrated, the rigid support structure 1720 may be comprised of a plurality of separate structures 1722, 1724 and 1726 and constructed as seamless sheet of any suitable structural material such as sheet metal or may optionally be perforated as shown by perforations 1728. The sheet metal may be formed utilizing any number of well-known forming means such as rolling, using a hydraulic press or similar. Alternatively, the rigid support structure may be constructed of a polymer material and formed via injection molding, vacuum forming, thermoforming, etc. In any such rigid support structure, the number, configuration and specific design of the separate support structures is at least that which is necessary to define the curvature and help support the flexible display.

FIG. 18A illustrates an exploded isometric view of an exemplar flexible display embodiment mounted to an exemplar rigid support structure of the present invention. As shown in the preassembled and formed condition, flexible display screen 1806 is mounted to support structure 1804 which assisted in the final forming of flexible display 1806. As schematically illustrated in FIG. 18A, the length of the flexible display 1806 before forming appears longer than the formed display 1806'. This is due to the forming operation as the original length of flexible display 1806 is approximately equal to the developed surface length, including the curvatures shown in flexible display 1806'. Rigid support structure 1804 is comprised of a plurality of channel members 1820, 1822, 1824, and 1826. During assembly, the flexible display 1806 is formed and fixed to the support structure 1804 as the flexible display 1806 is inserted into the left-side and right-side channel members 1820 and 1822. Once channel members 1820 and 1822 are attached to the flexible display 1806, the flexible display 1806 is in a final or semifinal shape and then top and bottom channel member 1824 and 1826 are attached to complete the shaping operation and assembly of the rigid support structure 1802. One skilled in the art will recognize that any of the plurality of channel portions 1820, 1822, 1824, and 1826 may be straight or curved, depending on the final desired curvature of the flexible display 1802. Alternatively, channel members 1820, 1822, and 1824 may be preassembled where flexible display 1806 slides into place and the channel member 1826 is then added to complete the assembly. Additionally, similar encapsulation shapes besides channel-like may be utilized to form the channel-like members 1820, 1822, 1824, and 1826. In this embodiment, the flexible display 1806 has been manipulated in y-axis and z-axis to produce the final desired shape, however one skilled in the art will recognize that manipulation to the final desired shape is not limited to just the y-axis and z-axis as it may also be manipulated simultaneously in the x-axis, or any combination thereof, but in any case, the flexible display 1806 will not be stretchable or compressible along any axis to any significant degree. While the embodiment shown in FIG. 18A corresponds to the top flexible display layer of schematic illustration of FIG. 7, one skilled in the art will recognize that any of the assembly components or methods shown in FIGS. 7 through 11 or similar may be utilized along with other methods not shown but contemplated by the embodiments of the present invention. Moreover, following assembly, as illustrated in FIG. 18A, any of the edge assemblies illustrated in FIGS. 16A through 16E or similar may be utilized to complete the assembly. Those skilled in the art will recognize that other edge embodiments may be utilized in addition to those illustrated and are contemplated by the present invention. Such assembly may be performed either before attachment to the EGM display support cradle 1808 or anytime thereafter.

FIG. 18B illustrates a side view of the exemplar flexible display 1806 mounted to a support structure 1804 of the embodiments of the present invention to form assembled rigid support structure 1802. As illustrated, once the flexible display is attached to the rigid support structure 1804, the flexible display 1806 is no longer flexible without undue force applied which does not occur in use in use on a gaming floor. Attachment of the flexible display 1806 can be achieved by any convenient means such as encapsulation by the channel members 1820, 1822, 1824, and 1806, mechanical fastening, adhesives or the like. While the embodiment shown in FIG. 18B corresponds to the top flexible display layer of schematic illustration of FIG. 7, one skilled in the art will recognize that any of the assembly methods shown in FIGS. 7 through 11 or similar may be utilized along with other methods not shown but contemplated by the embodiments of the present invention. After assembly, as illustrated in FIG. 18B, any of the edge assemblies illustrated in FIGS. 16A through 16E or similar may be utilized to complete the assembly. Those skilled in the art will recognize that other edge embodiments may be utilized in addition to those illustrates and are contemplated in the present invention. Such assembly may be performed either before attachment to the EGM display support cradle 1408 or anytime thereafter.

Figure 18C:
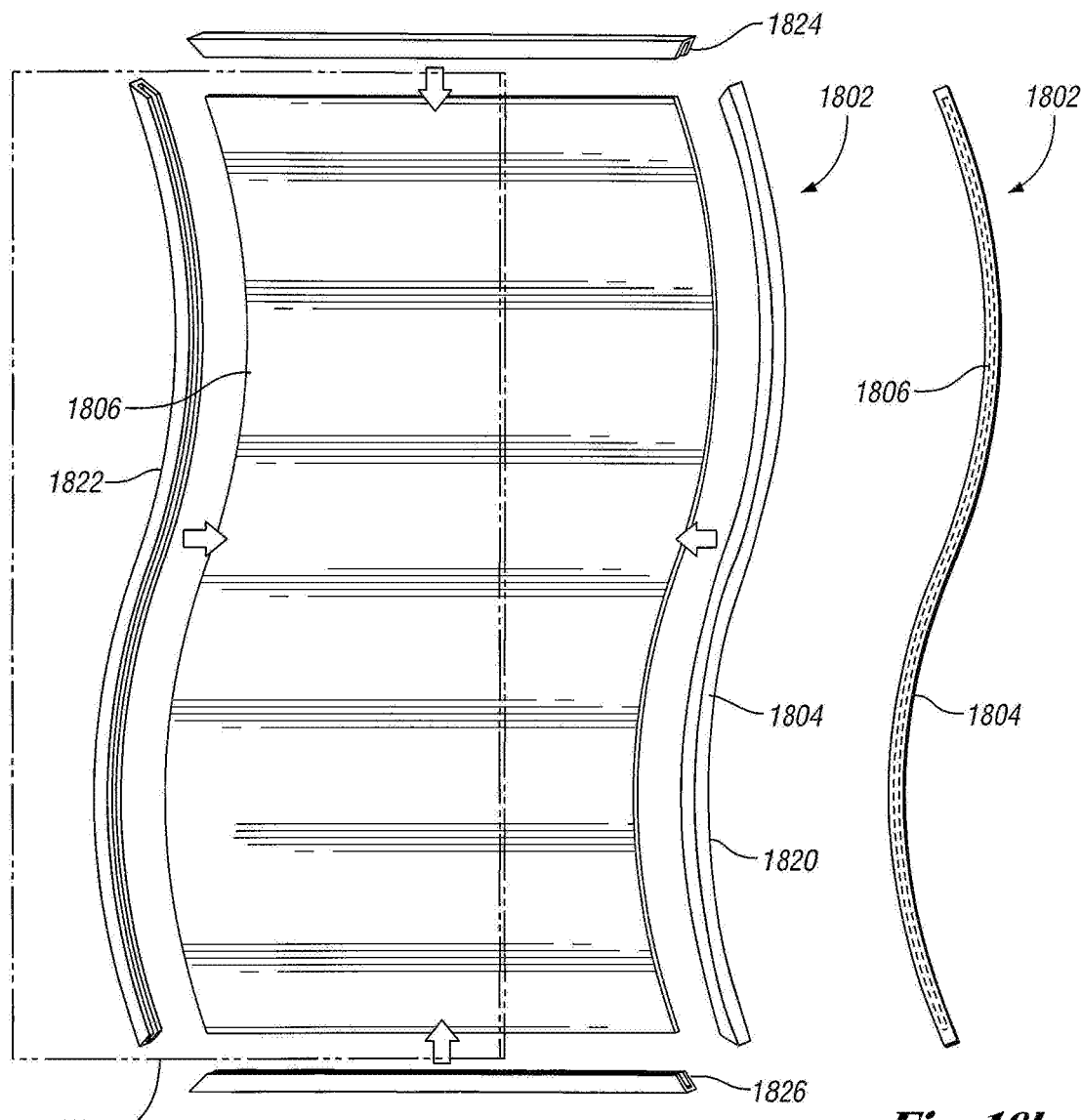
FIG. 18C illustrates a schematic partial cross-section view of a flexible display formed by a frame type rigid support structure of the present invention.
Figure 18C:
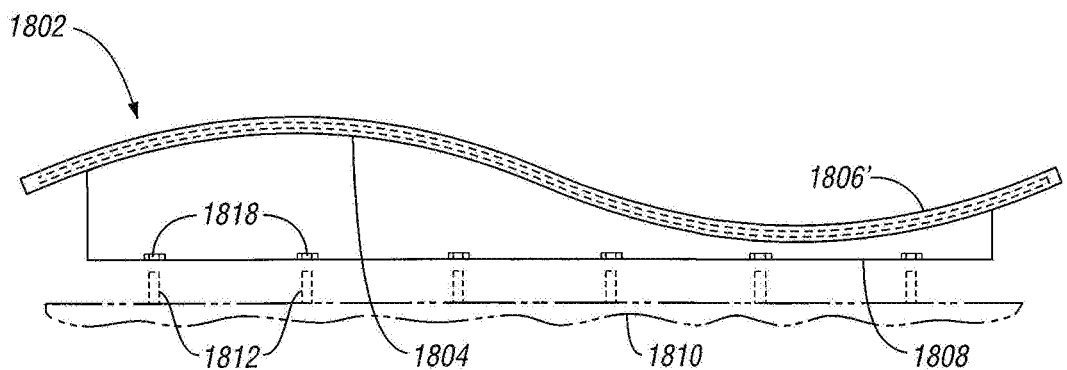

FIG. 18C illustrates a schematic partial cross-section view of the exemplar flexible display embodiment being formed and then attached to an exemplar rigid support 1802 of the present invention and further attached to a EGM display support cradle 1808 which is further attached to the EGM housing 1810. The flexible display 1806 may be pre-formed to an extent to assist in final shaping. During the assembly process, the flexible display 1806 will be formed in the same shape as the support structure 1804 and assembled by any conventional means and may include an additional transparent layer as illustrated in FIG. 7 through FIG. 11. Once attached to the rigid support structure 1804, the flexible display 1806' is no longer flexible and is in its final operational form. As previously described, the rigid support structure 1802 may be manufactured by sheet metal or plastic and after the flexible display 1806 is attached, the assembly 1802 is attached to the EGM display support cradle 1808. Attachment may be by any suitable means such as threaded stud 1812 projecting from the rigid support structure 1804 passing through a hole in the EGM display support cradle 1808, which is hollow and then retained by threaded nuts 1818 attached from the underside. Those skilled in the art will recognize that any suitable attachment means may be utilized, such as fasteners, adhesives, or the like. After assembly 1802 is attached to the EGM display support cradle 1808, it is then attached to the EGM housing 1810.

Although the upper surface of the EGM housing 1810 is shown as flat, along with the bottom surface of EGM display support cradle 1808, it may be advantageous to shape it in other ways for utility of cosmetic reasons, such as curved. One skilled in the art will recognize that the assembly steps described can be in any convenient order and although the various components are illustrated as being in a flat or horizontal state, assembly may also be accomplished at any angle such as vertical or any combination thereof such as attaching the rigid support structure 1802 to the rigid support cradle 1804 in a generally horizontal plane, and then attaching the EGM display support cradle 1808, also in a generally horizontal plane and rotating the partially complete assembly to a generally vertical position and attaching to the EGM housing 1810 which is normally in a generally vertical state. Those skilled in the art will recognize that the term "generally vertical state" of any embodiment shown or contemplated by the present invention may vary greatly and fall within a wide range of plus 40° to a negative 40° relative to true vertical, as an example, depending on the final EGM design.

FIG. 19A illustrates an exploded isometric view of a flexible display embodiment mounted to an exemplar rigid support structure of the present invention. As shown in the preassembled and formed condition, flexible display screen 1906 is mounted to frame member 1904 which assisted in the final forming of flexible display 1906'. As schematically illustrated in FIG. 19A, the length of the flexible display 1906 before forming appears longer than the formed display 1906'. This is due to the forming operation as the original length of flexible display 1906 is approximately equal to the developed surface length, including the curvatures shown in flexible display 1906'. Support structure 1904 is comprised of a frame member type structure. During assembly, the flexible display 1906 is formed and fixed to the frame member 1904 as the flexible display 1906 is pressed on to frame member 1904. Once frame member 1904 is attached to the flexible display 1906, the flexible display 1906' is in a final or semifinal shape and provide for rigid support structure 1902. One skilled in the art will recognize that frame member 1904. or any other embodiment illustrated or contemplated, may be straight and/or curved, depending on the final desired curvature of the flexible display 1906'. In this embodiment, the flexible display 1906 has been manipulated in y-axis and z-axis to produce the final desired shape, however one skilled in the art will recognize that manipulation to the final desired shape in not limited to just the y-axis and z-axis as it may also be manipulated simultaneously in the x-axis, or any combination thereof, but in any case, the flexible display 1906 will not be stretchable or compressible along any axis to any significant degree. While the embodiment shown in FIG. 19A corresponds to the top flexible display layer of schematic illustration of FIG. 7, one skilled in the art will recognize that any of the assembly components or methods shown in FIGS. 7 through 11 or similar may be utilized along with other methods not shown but contemplated by the embodiments of the present invention.

FIG. 19B illustrates a side view of the exemplar flexible display 1906' mounted to a frame member 1904 of the embodiments of the present invention to form assembled rigid support structure 1902. As illustrated, once the flexible display is attached to the support structure 1904, the flexible display 1906' is no longer flexible without undue force applied which does not occur in use in use on a gaming floor. Attachment of the flexible display 1906 can be achieved by any convenient means such as mechanical fastening, adhesives or the like and may include an integral lip or separate gasket like member 1908 for separation and location purposes. Additionally, a second frame member 1904' may optionally be added for additional support or other purposes. While the embodiment shown in FIG. 19B corresponds to the top flexible display layer of schematic illustration of FIG. 7, one skilled in the art will recognize that any of the assembly methods shown in FIGS. 7 through 11 or similar may be utilized along with other methods not shown but contemplated by the embodiments of the present invention. After assembly, as illustrated in FIG. 19B, any of the edge assemblies illustrated in FIGS. 16A through 16E or similar may be utilized to complete the assembly. Those skilled in the art will recognize that other edge embodiments may be utilized in addition to those illustrated and are contemplated by the present invention. Such assembly may be performed either before attachment to the EGM display support cradle 1908 or anytime thereafter.

FIG. 19C illustrates a schematic partial cross-section view of the exemplar flexible display 1906 embodiment being formed and then attached to an frame member 1904 to produce assembly 1902 of the present invention and further attached to a EGM display support cradle 1908 which is further attached to the EGM housing 1910. The flexible display 1906 may be pre-formed to any extent to assist in final shaping. As schematically illustrated in FIG. 19A, the length of the flexible display 1906 before forming appears longer than the formed display 1906'. This is due to the forming operation as the original length of flexible display 1906 is approximately equal to the developed surface length, including the curvatures shown in flexible display 1906'. The lengths are approximately equal as some distortion of the developed surface length will most likely occur in forming process. During the assembly process, the flexible display 1906 is formed in the same shape as the frame member 1904 and adhered by any conventional means or be captured by an additional transparent layer or bezel type assembly as illustrated in FIG. 7 through FIG. 11. Once attached to the frame member 1904, the flexible display 1906' is no longer flexible and is in its final operational form. As previously described, the frame member 1904 may be manufactured by sheet metal or a polymer material and after the flexible display 1906' is attached, the assembly 1902 will be attached to the EGM display support cradle 1908. Attachment may be by any suitable means such as threaded stud 1914 projecting from the rigid support structure 1902 passing through a number of standoffs between the rigid support structure 1904 and the EGM display support cradle 1908, which is hollow and then retained by threaded nuts 1912 attached from the underside. Those skilled in the art will recognize that any suitable attachment means may be utilized, such as fasteners, adhesives, or the like. After assembly, rigid frame structure 1902 is attached to the EGM display support cradle 1908, it is then attached to the EGM housing 1910. Although the upper surface of the EGM housing 1910 is shown as flat, along with the bottom surface of EGM display support cradle 1908, it may be advantageous to shape it in other ways for utility of cosmetic reasons, such as curved. One skilled in the art will recognize that the assembly steps described can be in any convenient order and although the various components are illustrated as being in a flat or horizontal state, assembly may also be accomplished at any angle such as vertical or any combination thereof such as attaching the flexible display 1906 to the rigid frame member 1904 in a generally horizontal plane, and then attaching the EGM display support cradle 1908, also in a generally horizontal plane and rotating the partially complete assembly to a generally vertical position and attaching to the EGM housing 1910 which is normally in a generally vertical state.

Although some of the written and detailed descriptions herein may be directed toward the main game display for an EGM, the embodiments of the present invention may also be utilized in secondary displays such as primary or secondary game displays in dual display EGMs, slot toppers, player tracking modules, digital button decks, etc., and thus not restricted to any particular flexible display configuration or use. Moreover, the embodiments of the present invention may also be utilized in other applications such as electronic signage or similar applications.

Although the invention has been described in detail with reference to several embodiments, additional variations and modifications exist within the scope and spirit of the invention as described and defined in the following claims.

We claim:

1. A gaming machine comprising:
a gaming machine cabinet including a display support structure;
a removable curved rigid display support;
a flexible display mounted to the curved rigid display support wherein the final shaping of the flexible display is determined and formed by the shape of the curved rigid display support wherein a final shape of the flexible display is permanent once mounted to the curved rigid display support
a display support cradle, stationary relative to the gaming machine cabinet, having a same shape as the curved flexible display so as to receive thereon the underside of the curved flexible display and maintain the permanent shape of the curved flexible display once mounted thereto; and
wherein the flexible display, curved rigid display support and display support cradle do not move or change shape during game play.

2. The gaming machine of claim 1 wherein the gaming machine is an electronic gaming machine.

3. The gaming machine of claim 1 wherein the flexible display is an organic flexible light emitting diode display.

4. The gaming machine of claim 1 wherein the removable curved rigid display support is mounted to a display support cradle which is mounted to the display support structure.

5. The gaming machine of claim 1 wherein the removable curved rigid display support is mounted to the display support structure utilizing a plurality of standoffs interposed between the removable curved rigid display support and the display support structure.

6. The gaming machine of claim 1 wherein the curved rigid display support is comprised of a plurality of separate supports.

7. The gaming machine of claim 1 wherein the wherein the flexible display includes an edge covering member.

8. The gaming machine of claim 1 wherein the curved rigid display support is fabricated of: (i) a single sheet of continuous material; (ii) a single sheet of perforated material or (iii) multiple continuous and/or perforated sheets of material.

9. A system comprising:
a gaming machine cabinet including a display support structure;
a removable curved rigid display support, the curved rigid display support fabricated of:

(i) a single sheet of continuous material; (ii) a single sheet of perforated material or (iii) multiple continuous and/or perforated sheets of material;
    a flexible display formed on and mounted to the curved rigid display support wherein a final shape of the flexible display is permanent once mounted to the curved rigid display support; and
    a display support cradle, stationary relative to the gaming machine cabinet, having a same shape as the curved flexible display so as to receive thereon the underside of the curved flexible display and maintain the permanent shape of the curved flexible display once mounted thereto; and
    wherein the flexible display, curved rigid display support and display support cradle do not move or change shape during game play.

10. The system of claim 9 wherein the flexible display formed on and mounted to the curved rigid display includes an edge covering member.

11. The system of claim 10 wherein the edge covering member is selected from the group consisting of: (i) a metallic edge covering strip; (ii) a polymer edge covering strip; (iii) an electroluminescent edge covering strip; (iv) a LED strip; and (v) a neon lighting element.

12. The system of claim 9 wherein the removable curved rigid display support is mounted to the display support structure utilizing a plurality of standoffs interposed between the removable curved rigid display support and the display support structure.

13. The system of claim 9 wherein the flexible display is an organic flexible light emitting diode display.

14. A display apparatus comprising:
    a removable curved rigid display support, the curved rigid display support fabricated of:
(i) a single sheet of continuous material; (ii) a single sheet of perforated material or (iii) multiple continuous and/or perforated sheets of material;
    a flexible display combined with the curved rigid display support whereby the shape of the flexible display is dictated and formed by the shape of the curved rigid display support wherein a final shape of the flexible display is permanent once mounted to the curved rigid display support;
    a display support cradle, stationary relative to the gaming machine cabinet, having a same shape as the curved flexible display so as to receive thereon the underside of the curved flexible display and maintain the permanent shape of the curved flexible display once mounted thereto; and
    wherein the flexible display, curved rigid display support and display support cradle do not move or change shape during game play.

15. The display apparatus of claim 14 wherein the combined flexible display and curved rigid display support also includes an edge covering member.

16. The display apparatus of claim 15 wherein the edge covering member is selected from the group consisting of: (i) a metallic edge covering strip; (ii) a polymer edge covering strip; (iii) an electroluminescent edge covering strip; (iv) a LED strip; and (v) a neon lighting element.

17. The display apparats of claim 14 wherein the curved rigid display support is comprised of a plurality of separate supports.

18. A method comprising:
utilizing a removable curved rigid display support;
combining a flexible display with the curved rigid display support such that the flexible display takes the shape of the curved rigid display support and wherein a final shape of the flexible display is permanent once mounted to the curved rigid display support;
positioning an edge covering member about at least a portion of the perimeter of the combined curved rigid display support and flexible display;
attaching the curved rigid display support and flexible display to a display support cradle, stationary relative to the gaming machine cabinet, having a same shape as the curved flexible display so as to receive thereon the underside of the curved flexible and maintain the permanent shape of the curved flexible display once mounted thereto; and
removably attaching the combined curved rigid display support and flexible display to a gaming machine mount such that the flexible display, curved rigid display support and display support cradle do not move or change shape during game play.

19. The method of claim 18 further comprising selecting the edge covering member from the group consisting of: (i) a metallic edge covering strip; (ii) a polymer edge covering strip; (iii) an electroluminescent edge covering strip; (iv) a LED strip; and (v) a neon lighting element.

20. The method of claim 18 further comprising utilizing a curved rigid display support comprising: (i) a single sheet of continuous material; (ii) a single sheet of perforated material or (iii) multiple continuous and/or perforated sheets of material.

21. The method of claim 18 further comprising utilizing a curved rigid display support having a plurality of separate supports.

22. The method of claim 18 further comprising removably attaching the combined curved rigid display support and flexible display to the gaming machine mount via a display support cradle.

23. The method of claim 18 further comprising removably attaching the combined curved rigid display support and flexible display to the gaming machine mount via a plurality of standoffs.

24. The method of claim 18 further comprising utilizing an organic light emitting diode flexible display.

25. The method of claim 18 further comprising combining the flexible display with the curved rigid display support by manipulating the flexible display to take the shape of the curved rigid display support.

26. The method of claim 18 further comprising combining the flexible display with the curved rigid display support by forming on, and mounting to, the curved rigid display support the flexible display such that the flexible display takes on the shape of the curved rigid display support.

27. The method of claim 18 further comprising utilizing the combination of the flexible display with the curved rigid display support to render the shape of the flexible display substantially permanent during use by a player of a gaming machine on which said flexible display is mounted.

* * * * *